(12) United States Patent
Hatada et al.

(10) Patent No.: US 10,146,203 B2
(45) Date of Patent: Dec. 4, 2018

(54) SPOT WELDING SYSTEM FOR MEASURING POSITION OF WELDING POINT AT WHICH WELDING IS PERFORMED

(71) Applicant: FANUC CORPORATION, Minamitsuru-gun, Yamanashi (JP)

(72) Inventors: Masanobu Hatada, Yamanashi (JP); Toshimichi Aoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 15/266,373

(22) Filed: Sep. 15, 2016

(65) Prior Publication Data

US 2017/0083002 A1    Mar. 23, 2017

(30) Foreign Application Priority Data

Sep. 18, 2015  (JP) ................... 2015-185973

(51) Int. Cl.
*G05B 19/402* (2006.01)
*B23K 11/10* (2006.01)
*B23K 11/00* (2006.01)

(52) U.S. Cl.
CPC ............ *G05B 19/402* (2013.01); *B23K 11/00* (2013.01); *B23K 11/105* (2013.01); *G05B 2219/37217* (2013.01); *G05B 2219/37405* (2013.01); *Y10S 901/08* (2013.01)

(58) Field of Classification Search
CPC ........ G05B 19/402; G05B 2219/37405; B23K 11/105
See application file for complete search history.

(56) References Cited

U.S. PATENT DOCUMENTS

| 7,863,539 | B2 | 1/2011 | Takahashi et al. |
|---|---|---|---|
| 8,426,761 | B2 | 4/2013 | Takahashi et al. |
| 8,513,560 | B2 | 8/2013 | Takahashi et al. |
| 2011/0120978 | A1 | 5/2011 | Takahashi et al. |
| 2011/0180516 | A1 | 7/2011 | Takahashi et al. |

FOREIGN PATENT DOCUMENTS

| CN | 101327547 A | 12/2008 |
|---|---|---|
| CN | 102039480 A | 5/2011 |
| CN | 102079008 A | 6/2011 |
| CN | 102139399 A | 8/2011 |

(Continued)

OTHER PUBLICATIONS

Decision to Grant a Patent for Japanese Application No. 2015-185973, dated Oct. 2, 2017, including English translation, 5 pages.

*Primary Examiner* — Amar Movva
(74) *Attorney, Agent, or Firm* — RatnerPrestia

(57) ABSTRACT

A spot welding system comprises a robot which changes a relative position of a spot welding gun and a workpiece. A control device drives an electrode drive motor so that a movable electrode of the spot welding gun abuts on the workpiece, and is formed so as to perform a position detection control which detects a position of the workpiece based on a position of the movable electrode when a state value of the electrode drive motor deviates from a predetermined range. An operation program includes a workpiece detection parameter for performing the position detection control. The workpiece detection parameter is set at each of welding points in the operation program.

9 Claims, 19 Drawing Sheets

(56) References Cited

FOREIGN PATENT DOCUMENTS

| | | |
|---|---|---|
| JP | 2001150150 A | 6/2001 |
| JP | 2008-307595 A | 12/2008 |
| JP | 2011-088175 A | 5/2011 |
| JP | 2011088177 A | 5/2011 |
| JP | 2011110578 A | 6/2011 |

FIG. 21

```
1: L P[1] 1000 mm/sec CNT100    SPOT[SD=1,t=2.0,P=1,ED=1 ]   TS=25
2: L P[3] 1000 mm/sec CNT100    SPOT[SD=1,t=2.0,P=1,ED=1 ]   TS=45
3: L P[2] 1000 mm/sec CNT100    SPOT[SD=1,t=2.0,P=1,ED=1 ]   TS=35
```
   81      82              83          93

FIG. 22

```
1: TS=25
2: L P[1] 1000 mm/sec CNT100    SPOT[SD=1,t=2.0,P=1,ED=1 ]
3: TS=45
4: L P[3] 1000 mm/sec CNT100    SPOT[SD=1,t=2.0,P=1,ED=1 ]
5: TS=35
6: L P[2] 1000 mm/sec CNT100    SPOT[SD=1,t=2.0,P=1,ED=1 ]
```

FIG. 23

```
1: TS=25
2: L P[1] 1000 mm/sec CNT100    SPOT[SD=1,t=2.0,P=1,ED=1 ]
3: L P[3] 1000 mm/sec CNT100    SPOT[SD=1,t=2.0,P=1,ED=1 ]
4: TS=35
5: L P[2] 1000 mm/sec CNT100    SPOT[SD=1,t=2.0,P=1,ED=1 ]
```

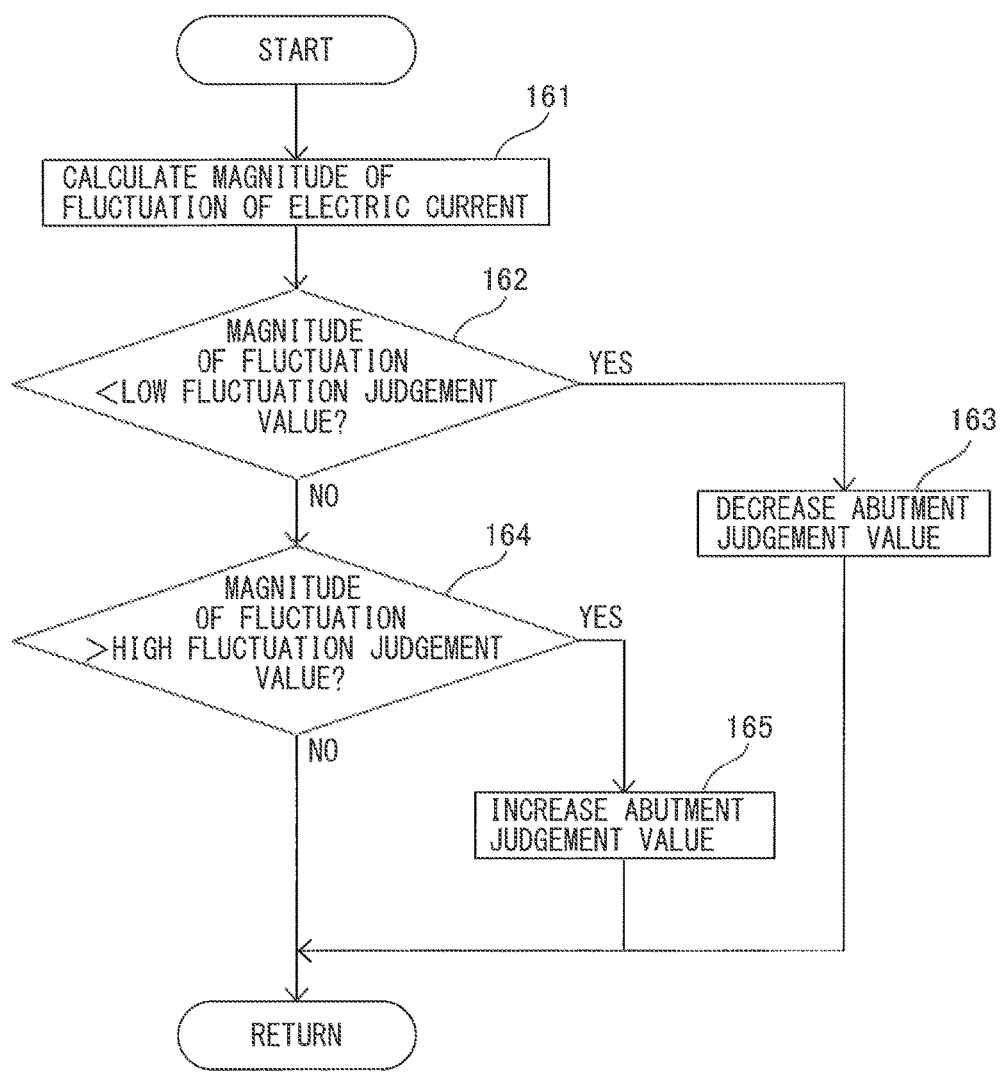

SPOT WELDING SYSTEM FOR MEASURING POSITION OF WELDING POINT AT WHICH WELDING IS PERFORMED

BACKGROUND OF THE INVENTION

1. Field of the Invention

The present invention relates to a spot welding system for measuring a welding point position at which welding is performed.

2. Description of the Related Art

In the conventional invention, a spot welding system including a spot welding gun and a robot has been known. The robot moves a workpiece or the spot welding gun. Then, the robot adjusts a relative position between electrodes of the spot welding gun and the workpiece. The spot welding gun sandwiches a metal plate or the like by a pair of electrodes. Then, the spot welding gun performs spot welding at a welding position (welding point) by applying a voltage between the electrodes.

In such a robot system, an accurate position of the workpiece is preferably obtained before performing an actual welding operation in order to weld the workpiece at a desired position of welding point. In other words, an accurate position of welding point is preferably determined in advance.

Japanese Laid-open Patent Publication No. 2011-88175A discloses a spot welding system including a spot welding gun and a robot which holds the spot welding gun. In the spot welding system, while a movable electrode and a workpiece to be welded which are separated from each other are made to move close to each other, an electric current or a torque of a servomotor is monitored. Then, in the spot welding system, a surface position of the workpiece to be welded is detected based on a position of the movable electrodes and a position of the multi-articulated robot when a change tendency of the electric current or the torque changes.

Japanese Laid-open Patent Publication No. 2008-307595 discloses a method for determining a position of a spot welding robot. In the method, while a movable side electrode is made to move in a direction to move close to an opposite side electrode, an electric current value of a servomotor which drives the movable side electrode is monitored. Subsequently, when the electric current value exceeds a predetermined value, a movement of the movable side electrode is stopped. Then, based on a space between the movable side electrode and the opposite side electrode, a teaching position of the opposite side electrode is set.

In a control for detecting a position of the workpiece as disclosed in the above patent literatures, the electric current of the servomotor which drives the movable electrode or the robot is monitored, thereby a contact of the electrode with the workpiece is detected. Then, a position of the workpiece is detected based on a position of the movable electrode at the instant.

The spot welding system can perform welding at a plurality of welding points on a single workpiece. In the workpiece, a material and a plate thickness may differ with respect to each welding point. Further, relative positions of welding points in relation to a position at which the workpiece is fixed are different. Accordingly, a rigidity of the workpiece when the electrode is made to come into contact with a predetermined welding point differs with respect to each welding point.

In addition, in the control of detecting a position of the workpiece, depending on a posture of the spot welding gun relative to the workpiece, a fluctuation of the electric current or the torque of the servomotor for a relative movement occurs. Since a posture of the workpiece and the robot when welding is performed differs with respect to each welding point, the fluctuation of the electric current or the torque of the servomotor differs with respect to each welding point.

In the above patent literatures, a method of detecting a position of the workpiece without consideration of the rigidity of the workpiece at a welding point and a direction of the welding point is disclosed. A parameter of the servomotor such as a movement speed of the movable electrode is set to be constant with respect to every welding point. As the parameter of the servomotor, a parameter determined from experience, a parameter determined with reference to a standard welding point, or a parameter determined by selecting a representative welding point from the workpiece is used.

However, the servomotor is driven using the constant parameter with respect to a plurality of welding points, which may cause a time of the position detection control to be long, and may cause a position detection accuracy to decrease. For example, at a welding point at which the rigidity of the workpiece is high, a movement speed of the movable electrode and the robot can be higher. However, since the movement speed is not changed in accordance with welding points, the time may be long. On the other hand, at a welding point at which the rigidity of the workpiece is low, the position detection accuracy may deteriorate.

Further, as a judgement value for judging the contact of the electrode with the workpiece as well, a judgement value determined from experience, a judgement value determined from a posture at a standard welding point (generally, a posture in which the electrode extends in a vertical direction), or a judgement value determined by selecting a representative welding point from the workpiece is used. Consequently, when the fluctuation of the electric current or the torque is small, the time of the position detection control more than necessary may be employed. Further, when the fluctuation of the electric current or the torque is large, an erroneous judgement may be made.

SUMMARY OF THE INVENTION

A spot welding system of the present invention comprises a spot welding gun including a pair of electrodes disposed so as to be opposed to each other, and a robot which changes a relative position of the spot welding gun and a workpiece so that the workpiece is disposed between the pair of electrodes. The spot welding system comprises a control device which controls the spot welding gun and the robot. The robot includes a robot position detector for detecting a position and a posture of the robot. The spot welding gun includes a movable electrode which can move and an opposite electrode which is opposed to the movable electrode. The spot welding gun includes an electrode drive motor which drives the movable electrode, and an electrode position detector for detecting a position of the movable electrode. The control device includes a storage part which stores an operation program. The control device is formed so as to be capable of detecting a state value of the electrode drive motor including an electric current, a torque, or a number of rotations of the electrode drive motor. The control device further drives the movable electrode and is formed so as to perform a position detection control which detects a position of the workpiece based on the position of the movable electrode when the state value of the electrode drive motor deviates from a predetermined range. A plurality of welding points are set in the operation program. The operation program includes a workpiece detection parameter for performing the position detection control. The workpiece detection parameter is set at each welding point. The control device performs the position detection control based on the workpiece detection parameter obtained from the operation program with respect to each welding point.

In the invention as described above, the workpiece detection parameter can be associated with a welding instruction at the plurality of welding points.

In the invention as described above, the workpiece detection parameter can be included in the welding instruction at each welding point.

In the invention as described above, the operation program can include the welding instruction at each welding point and setting information for setting the workpiece detection parameter at each welding point. The welding instruction can include a sign or a number relating to the workpiece detection parameter. The workpiece detection parameter corresponding to the sign or the number can be set in the setting information.

In the invention as described above, the workpiece detection parameter can include a movement speed of the movable electrode when the movable electrode moves close to a surface of the workpiece.

In the invention as described above, the control device can include a calculation part which calculates the movement speed of the movable electrode based on the state value of the electrode drive motor when the movable electrode abuts on the surface of the workpiece. The control device can include an update part which updates the movement speed of the movable electrode set in the operation program based on the movement speed of the movable electrode calculated by the calculation part.

In the invention as described above, the workpiece detection parameter can include an abutment judgement value for judging whether or not the movable electrode abuts on the surface of the workpiece.

In the invention as described above, the control device can include a calculation part which calculates the abutment judgement value based on the state value of the electrode drive motor when the movable electrode abuts on the surface of the workpiece. The control device can include an update part which updates the abutment judgement value set in the operation program based on the abutment judgement value calculated by the calculation part.

An another spot welding system of the present invention comprises a spot welding gun including a pair of electrodes disposed so as to be opposed to each other and a robot which changes a relative position of the spot welding gun and a workpiece so that the workpiece is disposed between the pair of electrodes. The spot welding system includes a control device which controls the spot welding gun and the robot. The robot includes a robot drive motor which drives arms and a wrist portion and a robot position detector for detecting a position and a posture of the robot. The control device includes a storage part which stores an operation program. The control device is formed so as to be capable of detecting a state value of the robot drive motor including an electric current, a torque, or a number of rotations of the robot drive motor. The control device further drives the robot and is formed so as to perform a position detection control which detects a position of the workpiece based on the position and the posture of the robot when the state value of the robot drive motor deviates from a predetermined range. A plurality of welding points are set in the operation program. The operation program includes a workpiece detection parameter for performing the position detection control. The workpiece detection parameter is set at each welding point. The control device performs the position detection control based on the workpiece detection parameter obtained from the operation program with respect to each welding point.

BRIEF DESCRIPTION OF THE DRAWINGS

FIG. 21 is a diagram illustrating a first description method of an operation program according to an embodiment.

FIG. 22 is a diagram illustrating a second description method of the operation program according to the embodiment.

FIG. 23 is a diagram illustrating a third description method of the operation program according to the embodiment.

FIG. 32 is a flowchart of a control for updating the abutment judgement value according to the third embodiment.

DETAILED DESCRIPTION

First Embodiment

A spot welding system according to a first embodiment will be described with reference to FIG. 1 to FIG. 24.

Figure 1:
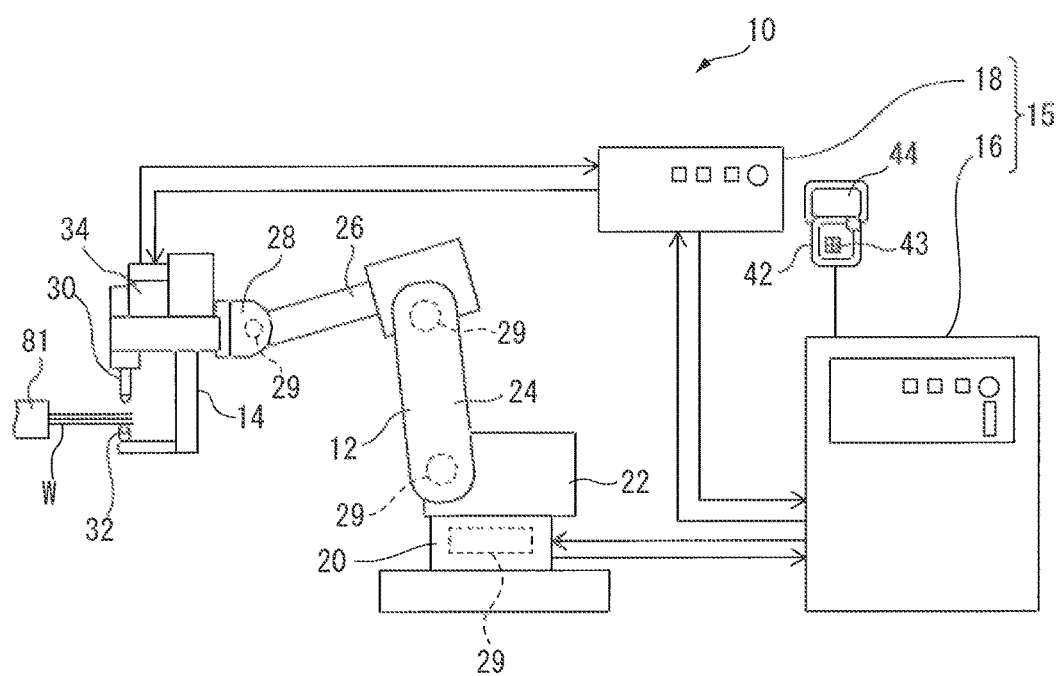
FIG. 1 is a schematic diagram of a first spot welding system according to a first embodiment.
Figure 2:
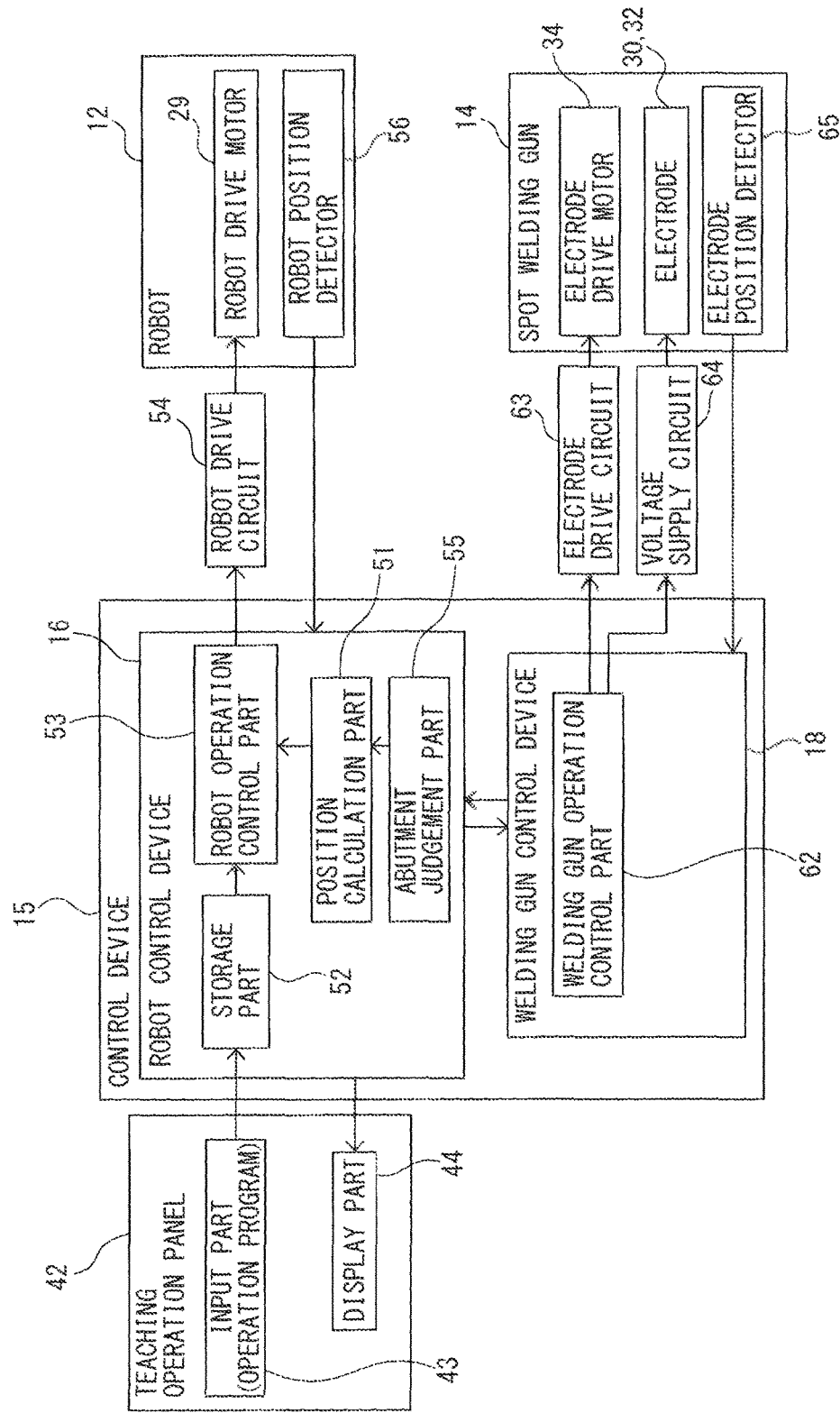
FIG. 2 is a block diagram of the first spot welding system according to the first embodiment.

In FIG. 1, a schematic diagram of a first spot welding system according to the present embodiment is illustrated. In FIG. 2, a block diagram of the first spot welding system according to the present embodiment is illustrated. With reference to FIG. 1 and FIG. 2, a spot welding system 10 comprises a robot 12 and a spot welding gun 14. The robot 12 according to the present embodiment is a multi-articulated robot having a plurality of articulation portions. The spot welding system 10 comprises a control device 15 which controls the robot 12 and the spot welding gun 14.

The control device 15 includes a robot control device 16 which controls the robot 12 and a welding gun control device 18 which controls the spot welding gun 14. The robot control device 16 and the welding gun control device 18 are configured with a calculation processing device including a CPU (central processing unit), a RAM (random access memory), and a ROM (read only memory) which are connected to each other via a bus, and the like. The robot control device 16 and the welding gun control device 18 are formed to be communicable with each other. The control device is not limited to this configuration and may be formed in such a manner as to control the robot 12 and the spot welding gun 14 by a single device.

The spot welding system 10 is formed so that the robot 12 drives, whereby a position of a workpiece W relative to the spot welding gun 14 can be changed. In the first spot welding system 10, the workpiece W is fixed to a fixing device 81 to be immovable. The robot 12 moves the spot welding gun 14, whereby a position of the workpiece W relative to the spot welding gun 14 is changed.

The robot 12 according to the present embodiment is of a vertical articulated type. The robot 12 comprises a pedestal base 20 which is disposed on a floor surface and a turning base 22 which is formed in a manner rotatable about an axial line extending in a vertical direction. The robot 12 includes a lower arm 24 which is supported by the turning base 22 to be rotatable, an upper arm 26 which is supported by the lower arm 24 to be rotatable, and a wrist portion 28 which is rotatably supported by the upper arm 26. The robot 12 includes robot drive motors 29 which drive the turning base 22, the lower arm 24, the upper arm 26, and the wrist portion 28. The robot drive motors 29 drive, whereby a position and a posture of the robot 12 are changed.

Note that the robot is not limited to the configuration as described above, and any robot which can change a relative position of the spot welding gun and the workpiece can be employed. In addition, a plurality of robots may be used.

The spot welding gun 14 includes a pair of electrodes composed of a movable electrode 30 and an opposite electrode 32 which is disposed so as to be opposed to the movable electrode 30. An electrode drive motor 34 drives, whereby the movable electrode 30 moves close to or away from the opposite electrode 32. The spot welding gun 14 sandwiches the workpiece W to be welded between the movable electrode 30 and the opposite electrode 32. Then, the spot welding gun 14 performs spot welding by applying a voltage between the movable electrode 30 and the opposite electrode 32. Note that the opposite electrode 32 according to the present embodiment is a fixed electrode, but, similarly to the movable electrode 30, the opposite electrode 32 may be formed in a movable manner by the electrode drive motor.

The spot welding system according to the present embodiment comprises a teaching operation panel 42 connected to the control device 15. The teaching operation panel 42 includes an input part 43 for inputting information relating to the robot 12 and the spot welding gun 14. An operator can input an operation program, a judgement value, and the like from the input part 43 to the control device 15. The input part 43 is configured with a keyboard, a dial, and the like. The teaching operation panel 42 includes a display part 44 which displays the information relating to the robot 12 and the spot welding gun 14.

The robot control device 16 includes a storage part 52 which stores information relating to a control of the robot 12 and a control of the spot welding gun 14. The operation program and an abutment judgement value as described below are stored in the storage part 52. Note that the welding gun control device 18 may include the storage part.

The robot control device 16 includes a robot operation control part 53 which controls the robot drive motors 29. The robot operation control part 53 transmits an operation instruction based on the operation program to a robot drive circuit 54. The robot drive circuit 54 supplies an electric current based on the operation instruction to the robot drive motors 29.

The robot 12 includes a robot position detector 56 for detecting the position and the posture of the robot 12. The robot position detector 56 according to the present embodiment is configured with a rotation angle detector mounted on each of the robot drive motor 29. The robot control device 16 receives a signal relating to a rotation position outputted from the robot position detector 56, The robot control device 16 can detect a position and a posture of the spot welding gun 14 based on the position and the posture of the robot 12.

The welding gun control device 18 includes a welding gun operation control part 62 which controls the electrode drive motor 34 and the voltage applied to the electrodes. The welding gun operation control part 62 transmits an operation instruction based on the operation program to an electrode drive circuit 63 and a voltage supply circuit 64. The electrode drive circuit 63 supplies an electric current based on the operation instruction to the electrode drive motor 34. The voltage supply circuit 64 supplies the voltage to the movable electrode 30 and the opposite electrode 32.

The spot welding gun 14 includes an electrode position detector 65 for detecting a position of the movable electrode 30. The electrode position detector 65 according to the present embodiment is configured with a rotation angle detector mounted on the electrode drive motor 34. The welding gun control device 18 can detect the position of the movable electrode 30 based on an output from the electrode position detector 65.

The spot welding system 10 according to the present embodiment performs a position detection control which detects the position of the workpiece W before performing an actual welding operation, so that welding can be performed at an accurate position. The position of the workpiece W is accurately detected and stored in the storage part 52 in advance, whereby welding can be performed at an accurate position on the workpiece W. Next, the position detection control according to the present embodiment will be described. In the position detection control according to the present embodiment, the movable electrode is driven, and the position of the workpiece is detected based on the position of the movable electrode when a state value of the electrode drive motor deviates from a predetermined range. As the state value of the motor, an electric current, a torque, and a rotation speed can be illustrated.

Figure 3:
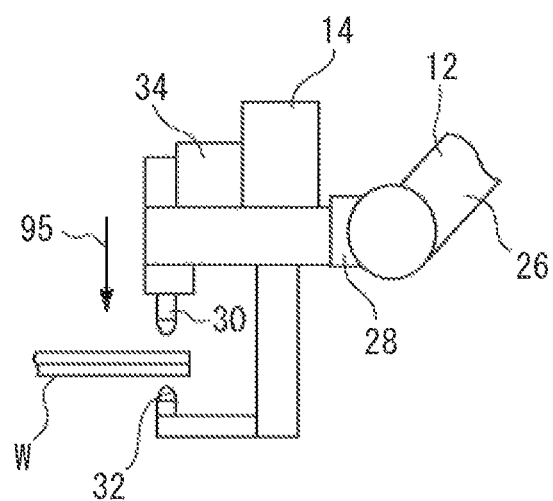
FIG. 3 is an enlarged schematic diagram of a spot welding gun and a workpiece.

In FIG. 3, an enlarged schematic diagram of the spot welding gun and the workpiece according to the present embodiment is illustrated. First, the robot operation control part 53 drives the robot 12. The robot 12 moves the spot welding gun 14 so that the workpiece W is disposed between the movable electrode 30 and the opposite electrode 32. Subsequently, as indicated by an arrow 95, the welding gun operation control part 62 makes the movable electrode 30 to move toward the workpiece W.

Figure 4:
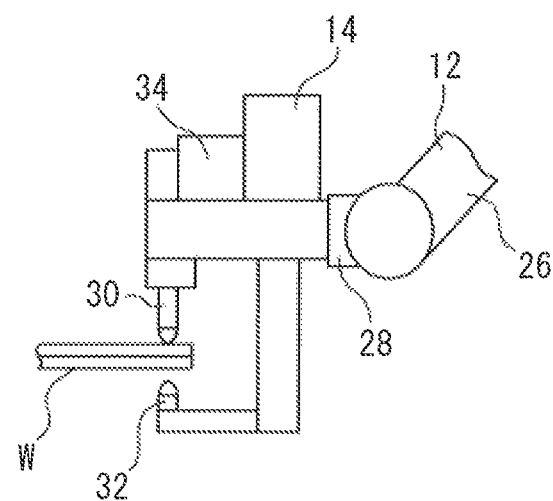
FIG. 4 is another enlarged schematic diagram of the spot welding gun and the workpiece.

In FIG. 4, another enlarged schematic diagram of the spot welding gun and the workpiece according to the present embodiment is illustrated. The movable electrode 30 moves toward the workpiece W so that the movable electrode 30 abuts on the workpiece W. The control device 15 detects that the movable electrode 30 comes into contact with the workpiece W. With reference to FIG. 2, the robot control device 16 includes an abutment judgement part 55. The abutment judgement part 55 judges whether or not the movable electrode 30 is in contact with the workpiece W. Note that the abutment judgement part 55 may be included in the welding gun control device 18.

The abutment judgement part 55 judges an abutment of the movable electrode 30 based on the state value of the electrode drive motor 34. As the state value of the electrode drive motor 34, an electric current, a torque, and a number of rotations of the electrode drive motor 34 can be illustrated. The electric current of the electrode drive motor 34 can be detected from the operation instruction transmitted from the welding gun operation control part 62. The torque of the electrode drive motor 34 can be calculated from the electric current. The number of rotations of the electrode drive motor 34 can be detected by the rotation angle detector such as an encoder, mounted on the electrode drive motor 34. To begin with, a control for judging the abutment of the movable electrode 30 on the workpiece W using the electric current of the electrode drive motor 34 will be described.

Figure 5:
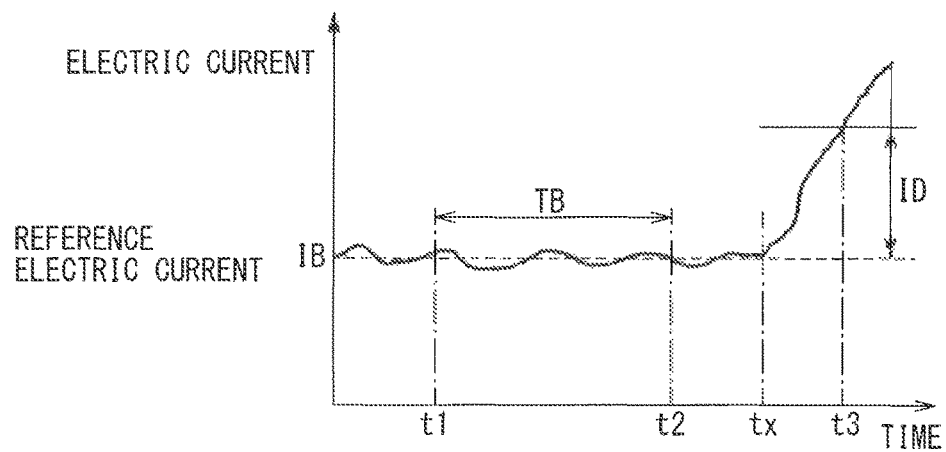
FIG. 5 is a graph of an electric current when a movable electrode comes into contact with the workpiece.

FIG. 5 is a graph illustrating a change of the electric current when the movable electrode moves toward the workpiece. The movable electrode 30 moves, whereby the movable electrode 30 abuts on the workpiece W at a time tx. In the present embodiment, a feedback control of the electrode drive motor 34 is performed. In other words, the position of the movable electrode 30 is detected based on an output of the rotation angle detector mounted on the electrode drive motor 34. Then, when a difference between the position of the movable electrode 30 and a position of the operation instruction outputted from the welding gun operation control part 62 is large, the electric current supplied to the electrode drive motor 34 is increased. Accordingly, after the movable electrode 30 abuts on the workpiece W at the time tx, the electric current increases.

In the present embodiment, an interval TB from a time t1 to a time t2 is determined in advance. The interval TB is an interval in which there is no possibility of a contact of the movable electrode 30 with the workpiece W. The abutment judgement part 55 detects the electric current of the electrode drive motor 34 at the interval TB. The abutment judgement part 55 sets an average value of the electric current detected in the interval TB as a reference electric current IB. Then, the abutment judgement part 55 detects the electric current of the electrode drive motor 34 each at a predetermined time interval after the time t2. The abutment judgement part 55 calculates an increase amount ID of the electric current which is a difference between the reference electric current IB and a detected electric current I. When the increase amount ID of the electric current is greater than the abutment judgement value of the electric current, the abutment judgement part 55 judges that the movable electrode 30 comes into contact with the workpiece W. In an example as illustrated in FIG. 5, the increase amount ID of the detected electric current exceeds the abutment judgement value of the electric current at a time t3. The abutment judgement part 55 judges that the movable electrode 30 comes into contact with the workpiece W at the time t3.

Figure 6:
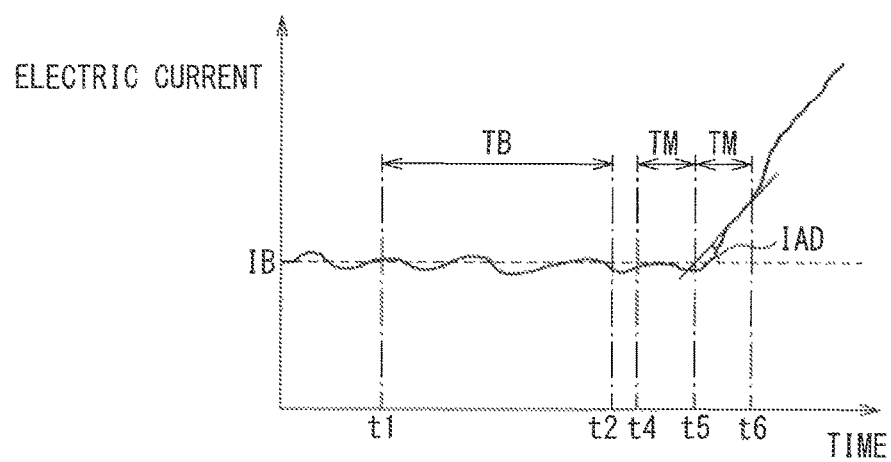
FIG. 6 is another graph of the electric current when the movable electrode comes into contact with the workpiece.

FIG. 6 shows another graph of the electric current when the movable electrode moves toward the workpiece. When judgement of the abutment is made using the electric current of the electrode drive motor 34, a judgement can be made based on an increase rate of the electric current (increase amount of the electric current per unit time). The abutment judgement part 55 detects the reference electric current IB at the interval TB from the time t1 to the time t2. The abutment judgement part 55 detects the electric current each at a predetermined time interval after the time t2. Then, based on the detected electric current, the increase rate of the electric current is calculated.

For example, the abutment judgement part 55 calculates the increase rate of the electric current at an interval TM from a time t4 to a time t5. At this time, as the increases amount of the electric current, an increase amount from the reference electric current IB can be used. Further, the abutment judgement part 55 calculates the increase rate of the electric current at the interval TM from the time t5 to a time t6. In an example as illustrated in FIG. 6, at the time t6, the increase rate of the electric current exceeds the abutment judgement value of the increase rate of the electric current. The increase rate of the electric current at the instant corresponds to an angle IAD. The abutment judgement part 55 judges that the movable electrode 30 comes into contact with the workpiece W at the time t6.

Calculation of the increase rate of the electric current is not limited to this embodiment, and the increase rate of the electric current may be calculated based on a maximum value and a minimum value of the electric current at each interval TM and a time length of the intervals TM.

Note that the electric current of the electrode drive motor 34 corresponds to a torque outputted by the electrode drive motor 34. The torque of the electrode drive motor 34 can be calculated based on the electric current of the electrode drive motor 34. Thus, when the torque of electrode drive motor 34 is employed as the state value of the electrode drive motor 34, the abutment of the movable electrode 30 can be also detected by a control similar to a control of the electric current.

Figure 7:
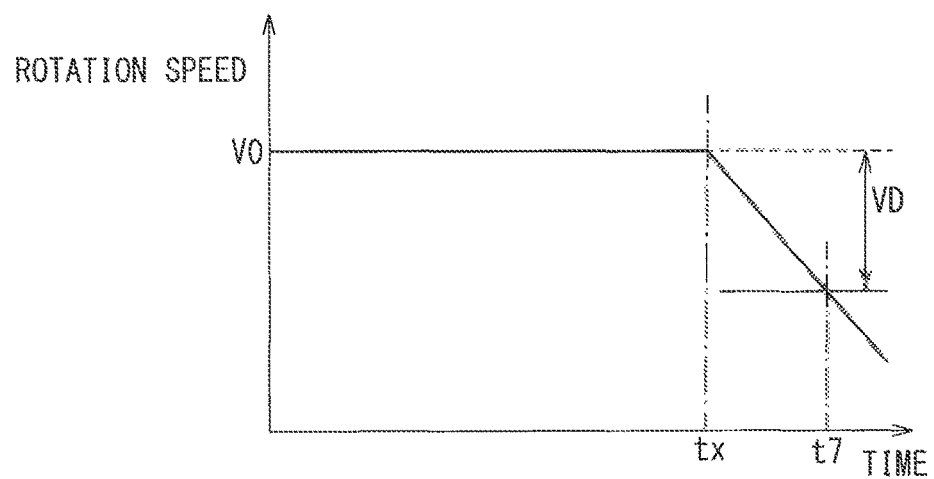
FIG. 7 is a graph of a rotation speed when the movable electrode comes into contact with the workpiece.

In FIG. 7, a graph of a rotation speed of the electrode drive motor when the movable electrode moves toward the workpiece is illustrated. The contact of the movable electrode 30 with the workpiece W can be judged based on the rotation speed of the electrode drive motor 34. The rotation speed is substantially constant till a time tx at which the movable electrode 30 comes into contact with the workpiece W. The abutment judgement part 55 sets the constant rotation speed as a reference rotation speed V0. After the time tx at which the movable electrode 30 comes into contact with the workpiece W, the rotation speed gradually decreases.

When a decrease amount VD from the reference rotation speed V0 exceeds the abutment judgement value of the rotation speed, the abutment judgement part 55 can judge that the movable electrode 30 abuts on the workpiece W. In an example as illustrated in FIG. 7, the decrease amount VD exceeds the abutment judgement value of the rotation speed at a time t7. The abutment judgement part 55 judges that the movable electrode 30 comes into contact with the workpiece W at the time t7.

Figure 8:
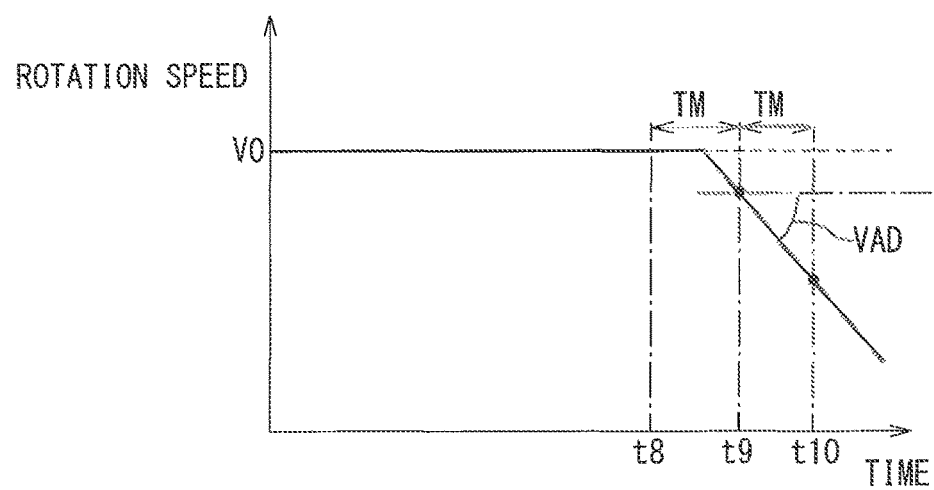
FIG. 8 is another graph of the rotation speed when the movable electrode comes into contact with the workpiece.

In FIG. 8, another graph of the rotation speed of the electrode drive motor when the movable electrode moves toward the workpiece is illustrated. With respect to the rotation speed of the electrode drive motor, judgement of the abutment of the movable electrode 30 can be made based on a decrease rate of the rotation speed. The decrease rate of the rotation speed is a decrease amount of the rotation speed per unit time. The abutment judgement part 55 calculates the decrease rate of the rotation speed each at the predetermined interval TM. For example, from a time t9 to a time t10, the decrease rate of the rotation speed corresponds to an angle VAD. Herein, the abutment judgement part 55 calculates the decrease rate of the rotation speed based on the decrease amount of the rotation speed at the interval TM and the time length of the interval TM. Then, when a magnitude of the decrease rate of the rotation speed (absolute value of the decrease rate of the rotation speed) exceeds the abutment judgement value of the decrease rate of the rotation speed, the abutment judgement part 55 can judge that the movable electrode 30 comes into contact with the workpiece W.

Thus, the control device 15 according to the present embodiment detects that the movable electrode 30 comes into contact with the workpiece W based on the state value of the electrode drive motor 34 including any of the electric current, the torque, or the rotation speed. The control device 15 judges that the movable electrode 30 comes into contact with the workpiece W when the state value of the electrode drive motor 34 deviates from a predetermined range.

With reference to FIG. 2, the abutment judgement part 55 transmits a signal in which the movable electrode 30 abuts on the workpiece W to the welding gun control device 18. The welding gun operation control part 62 transmits an instruction for stopping the electrode drive motor 34 so that the movable electrode 30 stops.

The robot control device 16 includes a position calculation part 51 which calculates the position of the workpiece W. The position calculation part 51 can detect, based on an output of the robot position detector 56 and the output of the electrode position detector 65, the position of the movable electrode 30 when the movable electrode 30 comes into contact with the workpiece W. In addition, the position calculation part 51 can calculate a position of a contact point of the opposite electrode 32 and a bottom side surface of the workpiece W (position of the workpiece W). In other words, the position calculation part 51 can detect a position of the bottom side surface of the workpiece W. A thickness of the workpiece W is stored in the storage part 52 in advance. The position calculation part 51 can calculate the position of the bottom side surface of the workpiece W based on the thickness of the workpiece W. Thus, the position calculation part 51 can calculate an accurate position of the workpiece at which welding is performed.

When an actual welding operation is performed, the control device 15 controls the position and the posture of the robot 12 based on the detected position of the workpiece W so that welding can be performed at an accurate position. Accordingly, the spot welding gun 14 is controlled so that the position and the posture are accurate.

With reference to FIG. 2, the control device 15 according to the present embodiment drives the robot 12 and the spot welding gun 14 based on the operation program. The operator operates the input part 43 of the teaching operation panel 42, whereby the operation program is inputted. The storage part 52 of the robot control device 16 stores the operation program. The position detection control according to the present embodiment is performed based on the operation program.

In this regards, in the operation program according to the present embodiment, a parameter for performing the position detection control is set in addition to a welding instruction which is instruction information of a welding operation. In the present invention, the parameter for performing the position detection control will be referred to as workpiece detection parameter. The position detection control is performed based on the workpiece detection parameter. As the workpiece detection parameter, a movement speed of the movable electrode and the abutment judgement value with respect to the state value of the electrode drive motor can be illustrated. In the operation program according to the present embodiment, a plurality of welding points are set. The workpiece detection parameter is individually set with respect to each welding point. In other words, for one welding point, the workpiece detection parameter for performing the position detection control at the welding point is set.

Figure 9:
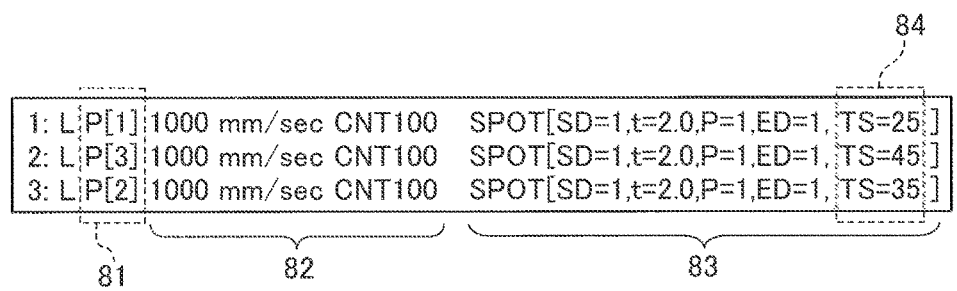
FIG. 9 is a part of an operation program in which a movement speed of the movable electrode is set.

In FIG. 9, a part of a first operation program of the welding operation according to the present embodiment is illustrated. In FIG. 9, the welding instruction for performing welding at three welding points is illustrated among the welding point described in the operation program. In a region 81, position numbers of the welding points are designated. For example, a sign P[1] is a first welding point, a sign P[3] is a third welding point, and a sign P[2] is a second welding point. Information of coordinate values corresponding to each of the position numbers is described, for example, at another part of the operation program. The operator operates the teaching operation panel, whereby the coordinate values at each of drive axes of an X-axis, a Y-axis, a Z-axis, and the like can be displayed. In a region 82, a movement speed of the robot 12 and instructions relating to a movement of the robot are illustrated. In a region 83, instructions relating to welding when welding is actually performed are illustrated.

In the region 84, the movement speed of the movable electrode 30 in the position detection control is described. For example, when the position detection control of the welding point of the sign P[1] is performed, a variable TS of the movement speed of the movable electrode 30 is 25. When the position detection control of the welding point of the sign P[2] is performed, the variable TS of the movement speed of the movable electrode 30 is 35. Thus, the movement speed of the movable electrode is set with respect to each welding point.

In the control device according to the present embodiment, a position detection mode in which the position detection control for detecting the position of the workpiece is performed and a welding operation mode in which the welding operation is actually performed are determined. The operator selects the position detection mode or the welding operation mode. Then, in the position detection mode, the control device 15 reads an instruction of the region 84 and performs the position detection control. On the other hand, in a welding operation mode in which the actual welding operation is performed, the control device 15 controls to perform the welding operation without reading the instruction of the region 84.

In the present embodiment, the movement speed of the movable electrode 30 is set with respect to each welding point in the operation program. Such a movement speed of the movable electrode 30 can be inputted to the input part 53 by the operator. Consequently, at a welding point at which a rigidity of the workpiece W is high when welding is performed, the movement speed of the movable electrode 30 can be set to be high. For example, when a distance from a position at which the fixing device 81 holds the workpiece W to a welding point is short and the rigidity of the workpiece W is high, the movement speed of the movable electrode 30 can be set to be high. Further, when a portion of a hard material is welded, the movement speed of the movable electrode 30 can be set to be high. As a result, a time for the position detection control can be shortened.

On the other hand, the movement speed of the movable electrode 30 can be made to be low at a welding point at which the rigidity of the workpiece W is low. Deterioration of a detection accuracy of the position of the workpiece due to the high movement speed of the movable electrode 30 can be suppressed.

Thus, in the present embodiment, the position detection control which detects the position of the workpiece under an optimal condition with respect to each welding point can be performed. In addition, the workpiece detection parameter is associated with the welding instruction at a plurality of welding points in the operation program. In particular, the workpiece detection parameter is included in the welding instruction at each welding point. Employing this configuration allows the operator to easily set the workpiece detection parameter while confirming positions of welding points. Further, the operator can confirm and change the workpiece detection parameter using the operation program.

Figure 10:
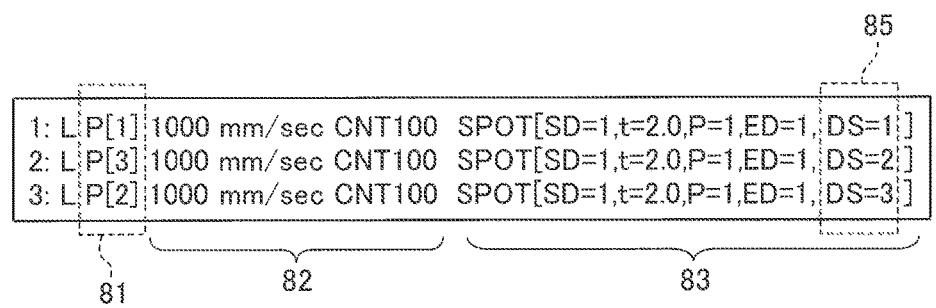
FIG. 10 is a part of another operation program in which the movement speed of the movable electrode is set.
Figure 11:
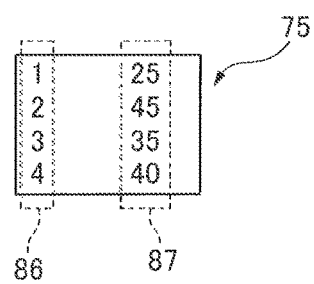
FIG. 11 is a part of setting information of another operation program in which the movement speed of the movable electrode is set.

In FIG. 10, a part of a second operation program of the welding operation according to the present embodiment is illustrated. In FIG. 11, another part of the second operation program of the welding operation according to the present embodiment is illustrated. In the second operation program, the movement speed of the movable electrode 30 is not set in a region 85, but instructions relating to the movement speed of the movable electrode 30 are described. The instructions set in the region 85 are described in numbers relating to the movement speed of the electrode. Note that, in the present embodiment, designation is made in numbers, but this configuration is not limitative, and sings such as "A" and "B" may be used.

With reference to FIG. 11, at a different part of the operation program, a correspondence table 75 of setting information for setting the workpiece detection parameter at each welding point is set. In the setting information, the workpiece detection parameter is set. In the correspondence table 75, the numbers designated in the region 85 are described in a region 86, and the movement speed of the movable electrode corresponding to the numbers is set in a region 87. For example, at the welding point of the sign P[1], a sign DS is designated to be 1 in the region 85, and the movement speed of the movable electrode is set to be 25 with reference to the correspondence table 75.

In the second operation program according to the present embodiment, a number or a sign relating to the movement speed of the movable electrode is designated in the welding instruction, and the workpiece detection parameter corresponding to the sign or the number is set at another part of the operation program. By adopting this configuration, management of data in the operation program is facilitated. In addition, the operator easily reads the operation program.

Note that, in the present embodiment, the workpiece detection parameter for the position detection control is described in the operation program of the welding operation, but this configuration is not limitative, and an operation program for the position detection control which is different from the operation program of the welding operation may be prepared in advance. The operation program for the position detection control can be generated so that the workpiece detection parameter is set with respect to each welding point. Then, after the position detection control is performed, a result of the position detection control can be reflected on the operation program of the welding operation.

Figure 12:
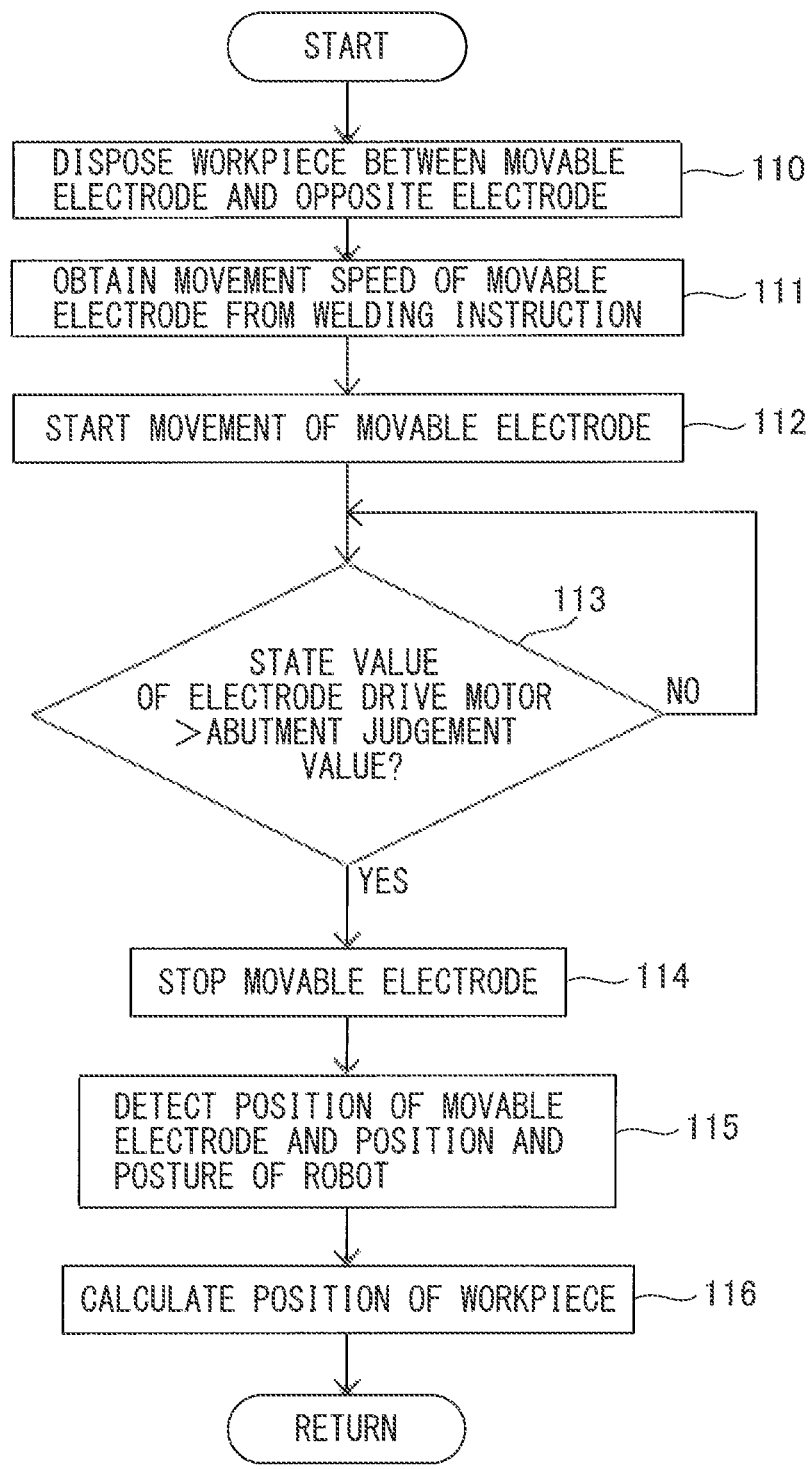
FIG. 12 is a flowchart of a first position detection control according to the first embodiment.

In FIG. 12, a flowchart of a first position detection control according to the present embodiment is illustrated. In the first position detection control, the movement speed of the movable electrode can be set with respect to each welding point, Note that the movement speed of the movable electrode corresponds to the rotation speed of the electrode drive motor. The control as illustrated in FIG. 12 can be performed at each welding point. With reference to FIG. 1, FIG. 2, and FIG. 12, the storage part 52 stores the predetermined operation program. As illustrated in FIG. 9 to FIG. 11, the operation program includes information of the movement speed of the movable electrode.

In step 110, the robot 12 disposes the workpiece between the movable electrode 30 and the opposite electrode 32. The position of the workpiece at this time is a predetermined position, and may be a rough position. A position at which the workpiece does not come into contact with the movable electrode 30 and the opposite electrode 32 is selected.

In step 111, the welding gun operation control part 62 obtains the movement speed of the movable speed from the operation program. Then, in step 112, the welding gun operation control part 62 drives the electrode drive motor 34 to start a movement of the movable electrode 30. At the instant, the welding gun operation control part 62 makes the movable electrode 30 to move at the movement speed obtained from the operation program.

In step 113, the abutment judgement part 55 judges whether or not the state value of the electrode drive motor 34 exceeds the abutment judgement value. For example, when the electric current of the electrode drive motor 34 is detected, it is judged whether or not the increase amount of the electric current exceeds the abutment judgement value. As the abutment judgement value at the instant, a value common to a plurality of welding points set in advance by the operator can be employed. In step 113, when the state value of the electrode drive motor is not more than the abutment judgement value, the movement of the movable electrode 30 continues. Then, when the state value of the electrode drive motor exceeds the abutment judgement value, the control proceeds to step 114.

In step 114, the welding gun operation control part 62 stops the movable electrode 30. In step 115, the position calculation part 51 detects the position and the posture of the robot 12 based on the output of the robot position detector 56. In addition, the position calculation part 51 detects the position of the movable electrode 30 based on the output of the electrode position detector 65.

Subsequently, in step 116, the position calculation part 51 calculates the position of the workpiece W based on the position and the posture of the robot 12 and the position of the movable electrode 30. Thus, the accurate position of the workpiece W can be detected.

As the workpiece detection parameter, the movement speed of the movable electrode is not limitative, but any parameter for performing the position detection control can be employed. Subsequently, the abutment judgement value as the workpiece detection parameter will be explained.

Figure 13:
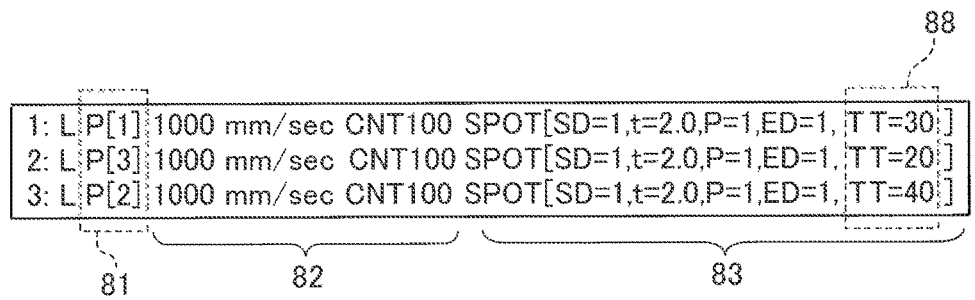
FIG. 13 is a part of an operation program in which an abutment judgement value is set.

In FIG. 13, a part of a third operation program of the welding operation according to the present embodiment is illustrated. In the region 83, the welding instruction relating to welding when welding is actually performed is illustrated. Then, in a region 88 of the operation program, the abutment judgement value as the workpiece detection parameter is illustrated. The abutment judgement value is described with respect to each welding point.

As the abutment judgement value, values corresponding to the state value of the electrode drive motor in which a judgement is made are set. When the abutment judgement part 55 judges the abutment of the movable electrode 30 based on the electric current of the electrode drive motor 34, the abutment judgement value of the electric current is set in the region 88. Further, when the abutment judgement part 55 judges the contact of the movable electrode 30 based on the rotation speed of the electrode drive motor 34, the abutment judgement value of the rotation speed is set in the region 88. In an example as illustrated in FIG. 13, the abutment judgement value at the welding point indicated by the sign P[1] is set to be 30, and the abutment judgement value at the welding point indicated by the sign P[3] is set to be 20.

Figure 14:
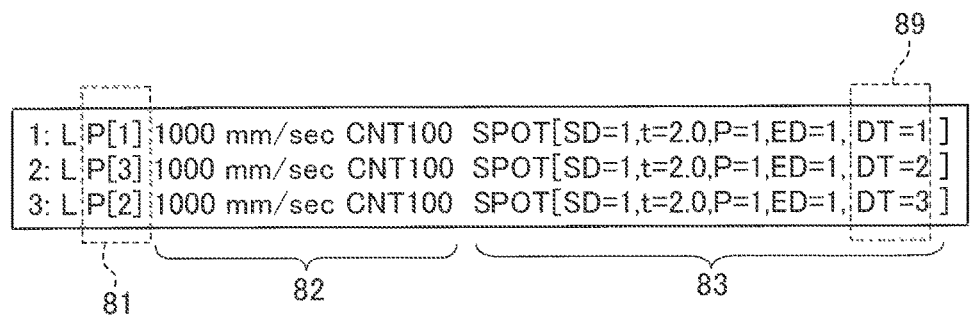
FIG. 14 is a part of another operation program in which the abutment judgement value is set.
Figure 15:
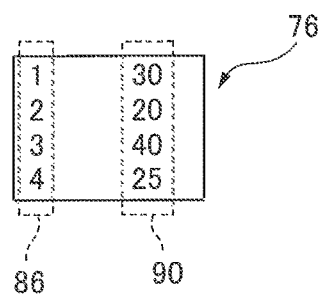
FIG. 15 is a part of setting information of another operation program in which the abutment judgement value is set.

In FIG. 14, a part of a fourth operation program of the welding operation according to the present embodiment is illustrated. In FIG. 15, another part of the fourth operation program of the welding operation according to the present embodiment is illustrated. When the abutment judgement value is employed as the workpiece detection parameter as well, the operation program can include the welding instruction at each welding point and the setting information for setting the workpiece detection parameter at each welding point. This setting information is set in a correspondence table 76.

In examples as illustrated in FIG. 14 and FIG. 15, numbers indicating the abutment judgement value are set in a region 89. Numbers in the region 86 correspond to numbers designated in the region 89. Then, the abutment judgement value is designated based on the correspondence table 76 as illustrated in FIG. 15. In a region 90, the abutment judgement value corresponding to each number is set. For example, a variable DT is set to be 1 at the welding point of the sign P[1]. Then, with reference to the correspondence table 76, the abutment judgement value at the welding point of the sign P[1] is set to be 30.

Figure 16:
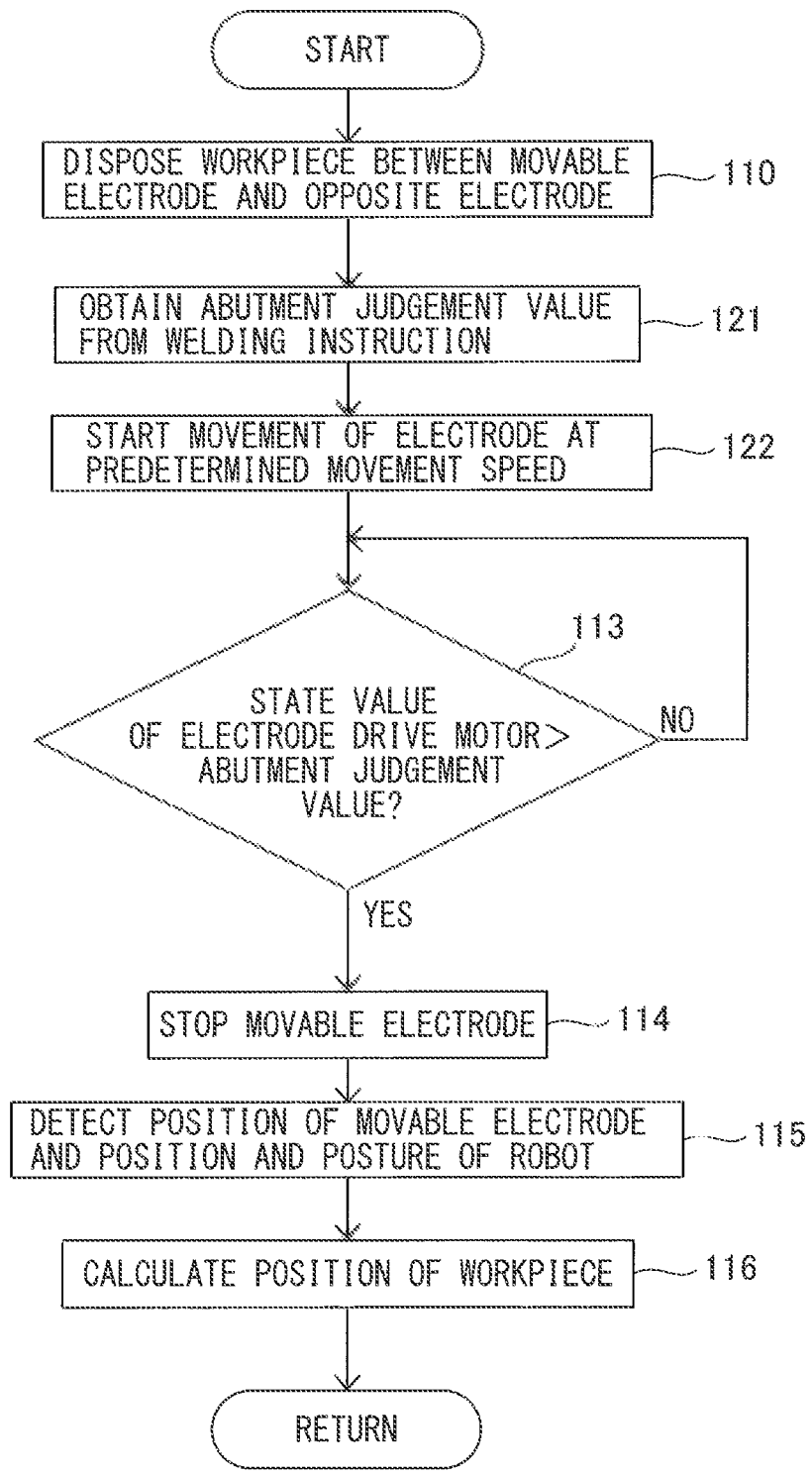
FIG. 16 is a flowchart of a second position detection control according to the first embodiment.

In FIG. 16, a flowchart of a second position detection control according to the present embodiment is illustrated. In the second position detection control, the abutment judgement value can be set with respect to each welding point.

In step 110, the robot 12 disposes the workpiece W between the movable electrode 30 and the opposite electrode 32. In step 121, the abutment judgement part 55 obtains the abutment judgement value from the welding instruction with respect to each welding point. In step 122, the movement of the movable electrode is started using a predetermined movement speed. As the movement speed of the movable electrode at this time, a movement speed common to a plurality of welding points can be used.

Then, in step 113, judgement of the state value of the electrode drive motor 34 is made based on the abutment judgement value obtained from the operation program. Then, the control after step 114 is similar to the first position detection control (see FIG. 12).

In the electric current or the torque of the electrode drive motor, a fluctuation occurs even in a constant state. When the fluctuation of the electric current or the torque is small, a threshold value is decreased so that the position detection control can be performed in a short time. On the other hand, when the fluctuation of the electric current or the torque is large, if the abutment judgement value is decreased, even though the movable electrode is actually not in contact with the workpiece, judgement in which the state value of the electrode drive motor deviates from a predetermined range may be made. Accordingly, when the fluctuation of the electric current or the torque is large, the abutment judgement value is increased so that erroneous judgement can be suppressed. In the present embodiment, since the abutment judgement value can be set with respect to each welding point, the position detection control which is optimal with respect to each welding point can be performed.

In the position detection control as described above, the single workpiece detection parameter for the single welding instruction of the operation program is described, but this configuration is not limitative, and the plurality of workpiece detection parameters can be set for the single welding instruction.

Figure 17:
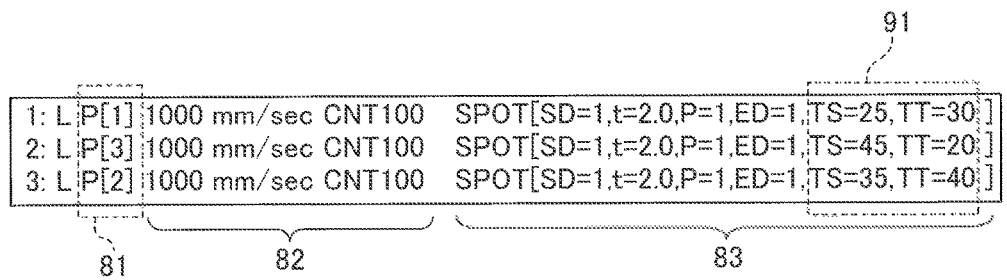
FIG. 17 is a part of an operation program in which the movement speed of the movable electrode and the abutment judgement value are set.

In FIG. 17, a part of a fifth operation program of the welding operation according to the present embodiment is illustrated. In the fifth operation program, both the variable TS indicating the movement speed of the movable electrode and a variable TT indicating the abutment judgement value are described in a region 91 as the workpiece detection parameter. The control device 15 can perform the position detection control by reading the movement speed of the movable electrode and the abutment judgement value.

Figure 18:
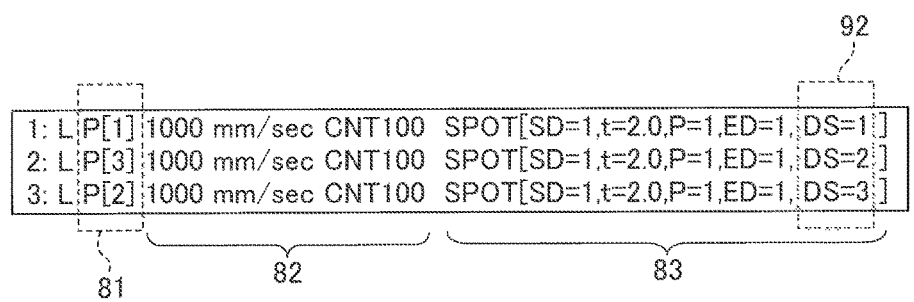
FIG. 18 is a part of another operation program in which the movement speed of the movable electrode and the abutment judgement value are set.
Figure 19:
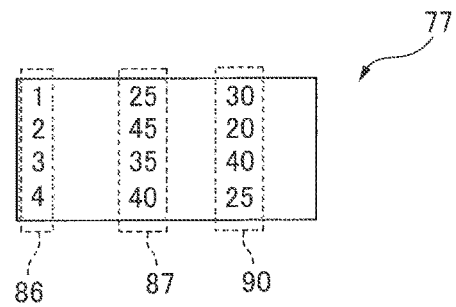
FIG. 19 is a part of setting information of another operation program in which the movement speed of the movable electrode and the abutment judgement value are set.

In FIG. 18, a part of a sixth operation program of the welding operation according to the present embodiment is illustrated. In FIG. 19, another part of the sixth operation program of the welding operation according to the present embodiment is illustrated. When the movement speed of the movable electrode and the abutment judgement value are employed as the workpiece detection parameter as well, the operation program can include the welding instruction at each welding point and the setting information for setting the workpiece detection parameter at each welding point. The setting information is set in a correspondence table 77 including the workpiece detection parameter.

In a region 92, numbers relating to the movement speed of the movable electrode and the abutment judgement value are set. The numbers in the region 86 of the correspondence table 77 correspond to the numbers designated in the region 92. The movement speed of the movable electrode 30 is set in the region 87. In addition, the abutment judgement value is set in the region 90. Thus, the movement speed of the movable electrode and the abutment judgement value can be designated in the single welding instruction at one time.

Figure 20:
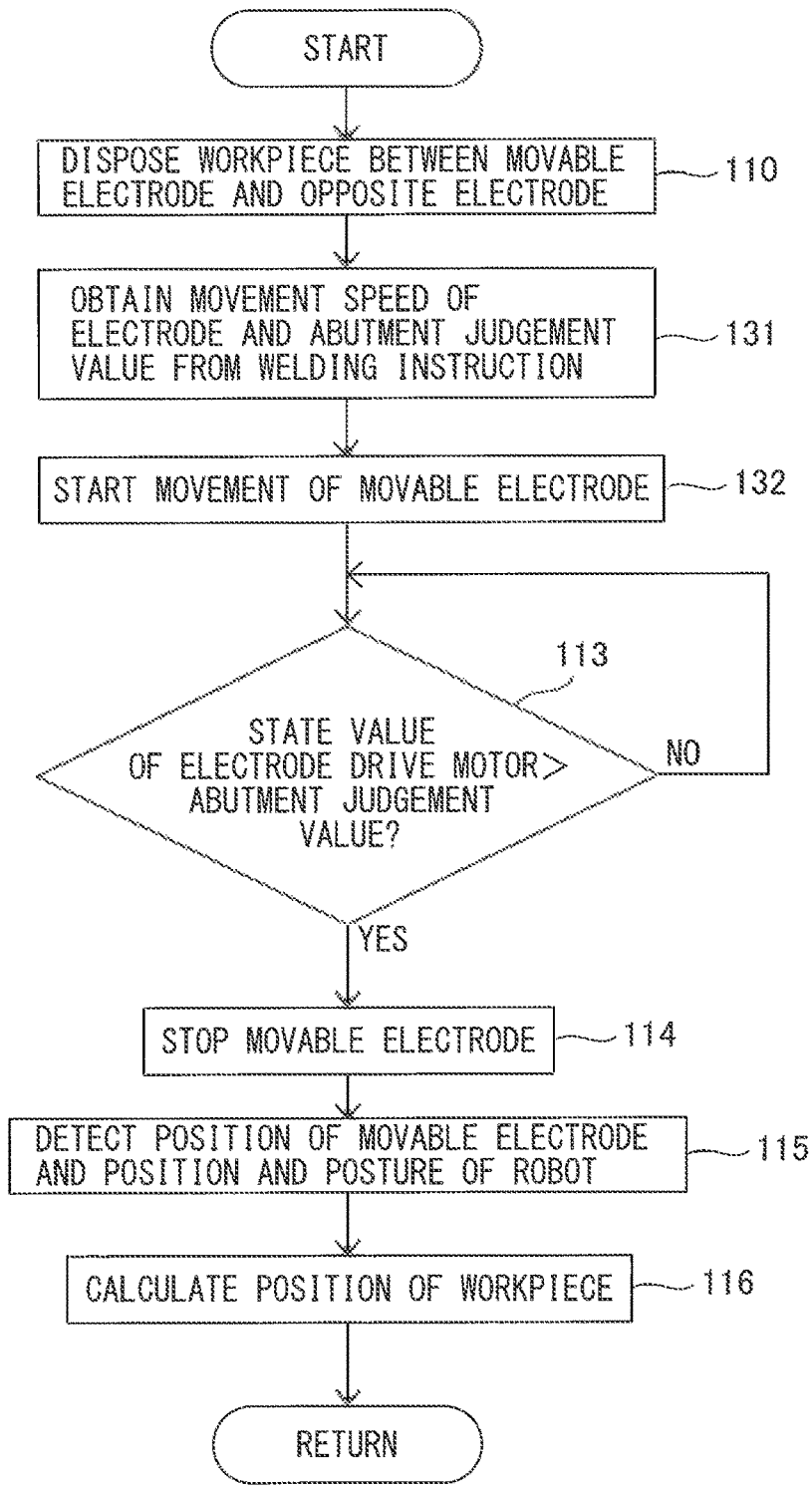
FIG. 20 is a flowchart of a third position detection control according to the first embodiment.

In FIG. 20, a flowchart of a third position detection control which obtains both the movement speed of the movable electrode and the abutment judgement value from the operation program is illustrated. In step 110, the robot 12 disposes the workpiece between the movable electrode 30 and the opposite electrode 32.

In step 131, the welding gun operation control part 62 obtains the movement speed of the movable electrode 30 from an instruction of the welding operation of the operation program. The abutment judgement part 55 obtains the abutment judgement value from the instruction of the welding operation of the operation program.

In step 132, the welding gun operation control part 62 starts the movement of the movable electrode 30 based on the obtained movement speed of the movable electrode. The movement speed of the movable electrode 30 is a speed designated by the operation program.

In step 113, the abutment judgement part 55 judges whether or not the state value of the electrode drive motor exceeds the abutment judgement value obtained from the operation program. The control from step 114 to step 116 is similar to the first position detection control (see FIG. 12).

Thus, the spot welding system according to the present embodiment can set the workpiece detection parameter such as the movement speed of the movable electrode and the abutment judgement value, with respect to each of a plurality of welding points. In other words, at a single welding point, the workpiece detection parameter for performing the position detection control at the welding point is set. Consequently, the spot welding system can shorten a time for the position detection control and suppress erroneous judgement. In addition, the spot welding system can suppress deterioration of a detection accuracy of the position of the workpiece, Herein, a description method of an operation program which sets the workpiece detection parameter with respect to each welding point will be explained. As the description method of the operation program, any description method in which the workpiece detection parameter is set with respect to each welding point can be employed.

FIG. 21 is a part of the operation program describing a first description method of the operation program according to the present embodiment. In the operation program as described above, the welding instruction includes the workpiece detection parameter. On the contrary, in FIG. 21, a case in which the workpiece detection parameter is not included in the welding instruction is illustrated. In the region 83, the welding instruction relating to welding when welding is actually performed is described. Meanwhile, in a region 93 away from the region 83, the variable TS of the movement speed of the movable electrode 30 is set. Thus, the workpiece detection parameter may be set with respect to each welding point.

FIG. 22 is a part of the operation program describing a second description method of the operation program according to the present embodiment. In this operation program, the workpiece detection parameter is described as a single instruction before a line with respect to each welding point. In an example as illustrated in FIG. 22, when the position detection control at the welding point of the sign P[1] is performed, the variable TS of the movement speed of the movable electrode is 25. When the position detection control at the welding point of the sign P[3] is performed, the variable TS of the movement speed of the movable electrode is 45.

FIG. 23 is a part of the operation program describing a third description method of the operation program according to the present embodiment. In this operation program, the single workpiece detection parameter is described for a plurality of welding points. The single workpiece detection parameter is set for each of a plurality of welding points. When the position detection control at the welding point of the sign P[1] is performed, the variable TS is 25. Further, when the position detection control at the welding point of the sign P[3] is performed, the variable TS is 25. In addition, when the position detection control at the welding point of the sign P[2] is performed, the variable TS is 35. Thus, when the workpiece detection parameter is the same, the workpiece detection parameter may be collectively set for a plurality of welding points. Note that, in the description methods as illustrated in FIG. 21 to FIG. 23, the workpiece detection parameter is not included in the welding instruction, but are set in association with welding instruction of welding points.

Next, with reference to FIG. 1, the spot welding gun 14 is held by the robot 12 in the embodiment as described above, but this configuration is not limited to this embodiment, and the robot can be used so as to change a relative position of the spot welding gun relative to the workpiece.

Figure 24:
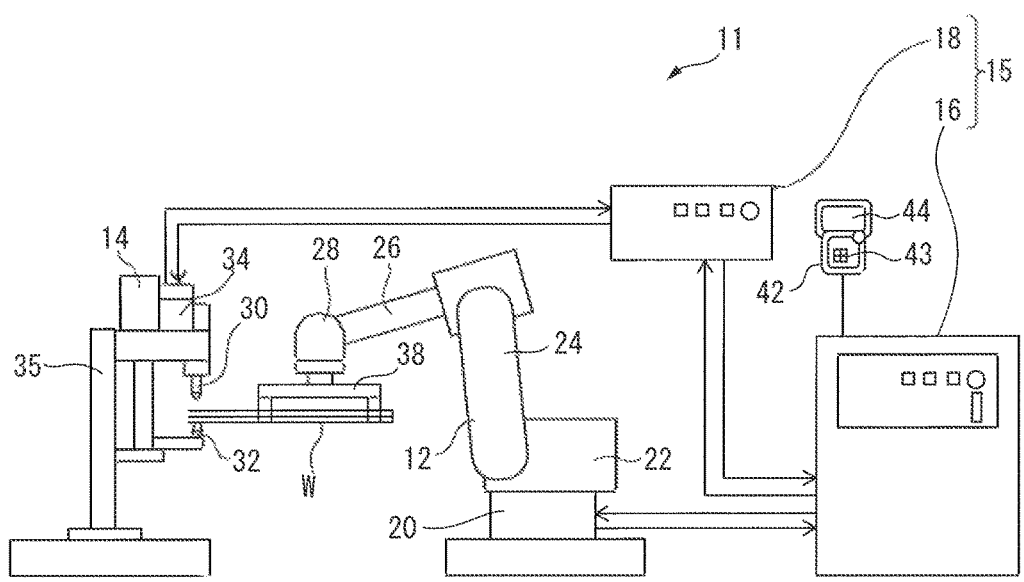
FIG. 24 is a schematic diagram of a second spot welding system according to the first embodiment.

In FIG. 24, a schematic diagram of a second spot welding system according to the present embodiment is illustrated. In a second spot welding system 11, the spot welding gun 14 is fixed to a stand 35 serving as a fixing device. A hand 38 is attached to the wrist portion 28 of the robot 12. The hand 38 is formed so as to be capable of holding the workpiece W. The hand 38 according to the present embodiment is controlled by the robot operation control part 53. The robot 12 is driven, whereby the position and the posture of the workpiece W are changed.

Thus, the workpiece W may be moved instead of moving the spot welding gun 14 by the robot 12. In the second spot welding system 11, to begin with, the robot 12 is driven, whereby the workpiece W is disposed between the movable electrode 30 and the opposite electrode 32. The control thereafter is similar to the control of the first spot welding system 10 as described above.

Second Embodiment

The spot welding system according to a second embodiment will be described with reference to FIG. 25 to FIG. 27. A structure of the spot welding system according to the present embodiment is similar to the first spot welding system according to the first embodiment (see FIG. 1 and FIG. 2).

In the position detection control according to the present embodiment, the robot 12 is driven without driving the movable electrode 30 of the spot welding gun 14, whereby the opposite electrode 32 is made to come into contact with the workpiece W. For example, if the spot welding gun is of a large size, the spot welding gun sags when the movable electrode comes into contact with the workpiece, which may not allow the correct position of the workpiece to be detected. The position detection control according to the present embodiment is preferable in such a case.

Figure 25:
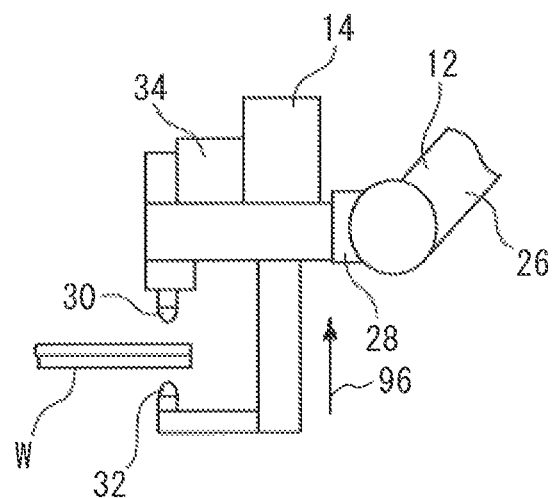
FIG. 25 is an enlarged schematic diagram of the spot welding gun and the workpiece according to a second embodiment.

In FIG. 25, an enlarged schematic diagram of the spot welding gun and the workpiece according to the present embodiment is illustrated. The robot 12 is driven, whereby the workpiece W is disposed between the movable electrode 30 and the opposite electrode 32. Subsequently, as indicated by an arrow 96, the robot 12 is driven, thereby moving the whole spot welding gun 14. In the example, the robot 12 moves upward the spot welding gun 14.

Figure 26:
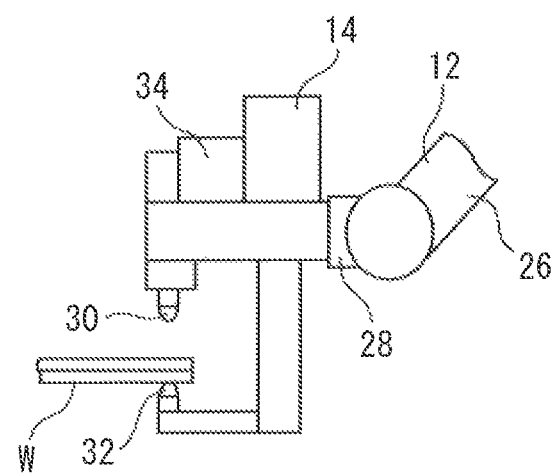
FIG. 26 is another enlarged schematic diagram of the spot welding gun and the workpiece according to the second embodiment.

In FIG. 26, another enlarged schematic diagram of the spot welding gun and the workpiece according to the present embodiment is illustrated. When the spot welding gun is moved, the opposite electrode 32 abuts on the workpiece W. The control device 15 detects that the opposite electrode 32 comes into contact with the workpiece W.

When judgement in which the opposite electrode 32 comes into contact with the workpiece W is made, the state value of the robot drive motors is detected in place of the state value of the electrode drive motor according to the first embodiment. The abutment judgement part 55 can judge an abutment of the opposite electrode 32 based on an electric current, a torque, or a rotation speed of the robot drive motors 29 which drive the robot 12. A control of judgement based on the electric current, the torque, or the rotation speed at this time is similar to the first embodiment. For example, judgement in which the opposite electrode 32 comes into contact with the workpiece W can be made based on the increase amount of the electric current from the reference electric current value or the increase rate of the electric current.

Figure 27:
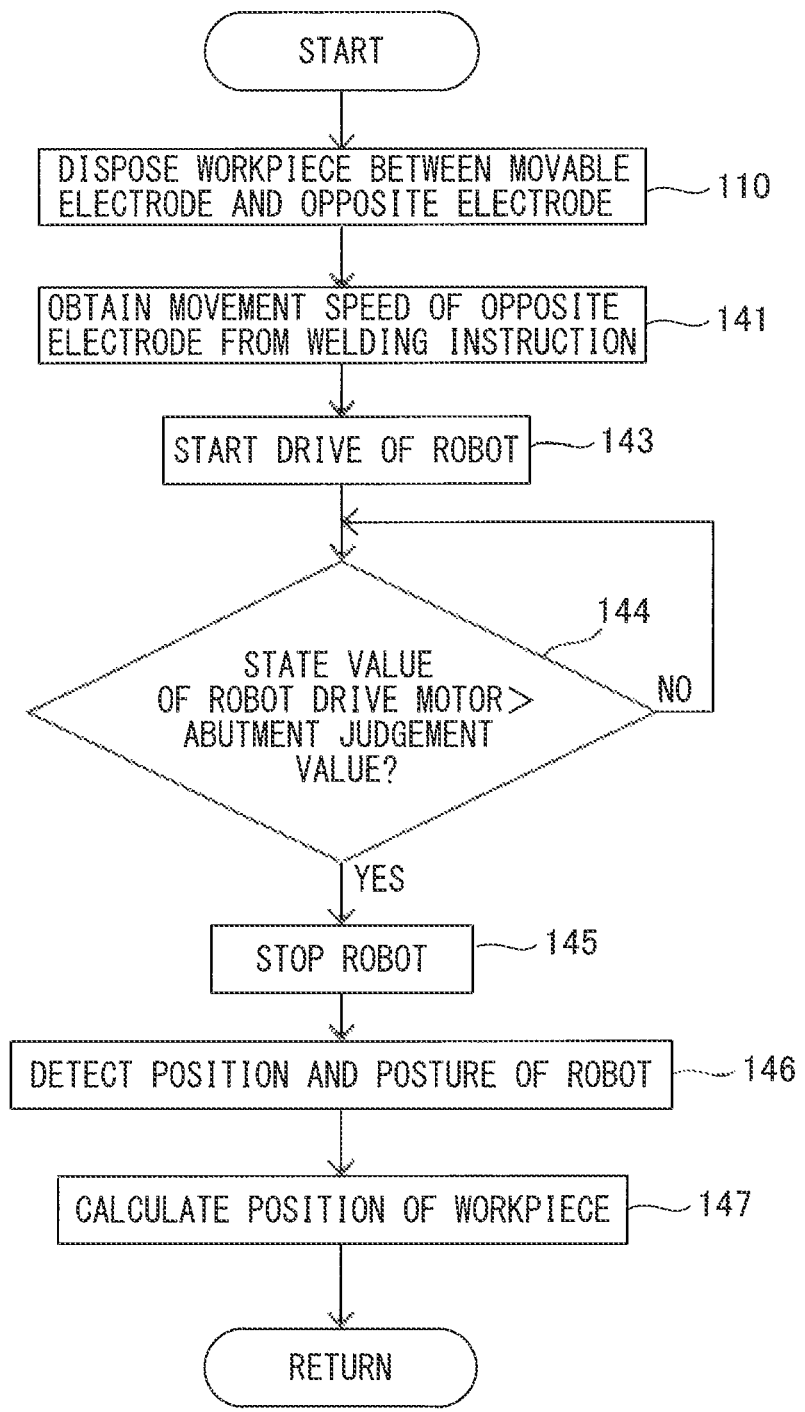
FIG. 27 is a flowchart of a position detection control according to the second embodiment.

In FIG. 27, a flowchart of the position detection control according to the present embodiment is illustrated. In an example as illustrated in FIG. 27, a movement speed of the opposite electrode is set in the welding instruction of the operation program. In other words, the movement speed of the opposite electrode is set with respect to each welding point in the operation program.

In step 110, the robot operation control part 53 drives the robot 12 so that the workpiece W is disposed between the movable electrode 30 and the opposite electrode 32.

In step 141, the robot operation control part 53 obtains the movement speed of the opposite electrode 32 from the welding instruction of the operation program.

In step 143, the robot operation control part 53 starts to drive the robot 12 at the movement speed of the opposite electrode 32. The robot 12 is driven, thereby moving the whole spot welding gun 14. The opposite electrode 32 moves toward the workpiece W.

Subsequently, in step 144, the abutment judgement part 55 judges whether or not the state value of the robot drive motors 29 is greater than the predetermined abutment judgement value. In step 144, when the state value of the robot drive motors 29 is not more than the predetermined abutment judgement value, driving the robot 12 continues. Then, when the state value of the robot drive motors 29 is greater than the abutment judgement value, the control proceeds to step 145.

In step 145, the robot operation control part 53 stops to drive the robot 12. In step 146, the position calculation part 51 detects the position and the posture of the robot based on the output of the robot position detector 56. In step 147, the position calculation part 51 detects a position of the opposite electrode 32 based on the position and the posture of the robot 12. Then, the position calculation part 51 can calculate the position of the workpiece based on the position of the opposite electrode 32.

In the example as described above according to the present embodiment, the movement speed of the opposite electrode is illustrated as the workpiece detection parameter set with respect to each welding point. The workpiece detection parameter is not limited to this configuration, but, similarly to the first embodiment, the abutment judgement value can be used. Alternatively, both the movement speed of the opposite electrode and the abutment judgement value can be employed. Further, as the workpiece detection parameter, the movement speed of the opposite electrode is not limitative, but the movement speed of the robot or the movement speed of the movable electrode may be used.

The other configuration, operations, and effects are similar to the first embodiment and thus description will not be repeated here.

Third Embodiment

The spot welding system according to a third embodiment will be described with reference to FIG. 28 to FIG. 32. The spot welding system according to the present embodiment updates the workpiece detection parameter set in the operation program to a proper value.

Figure 28:
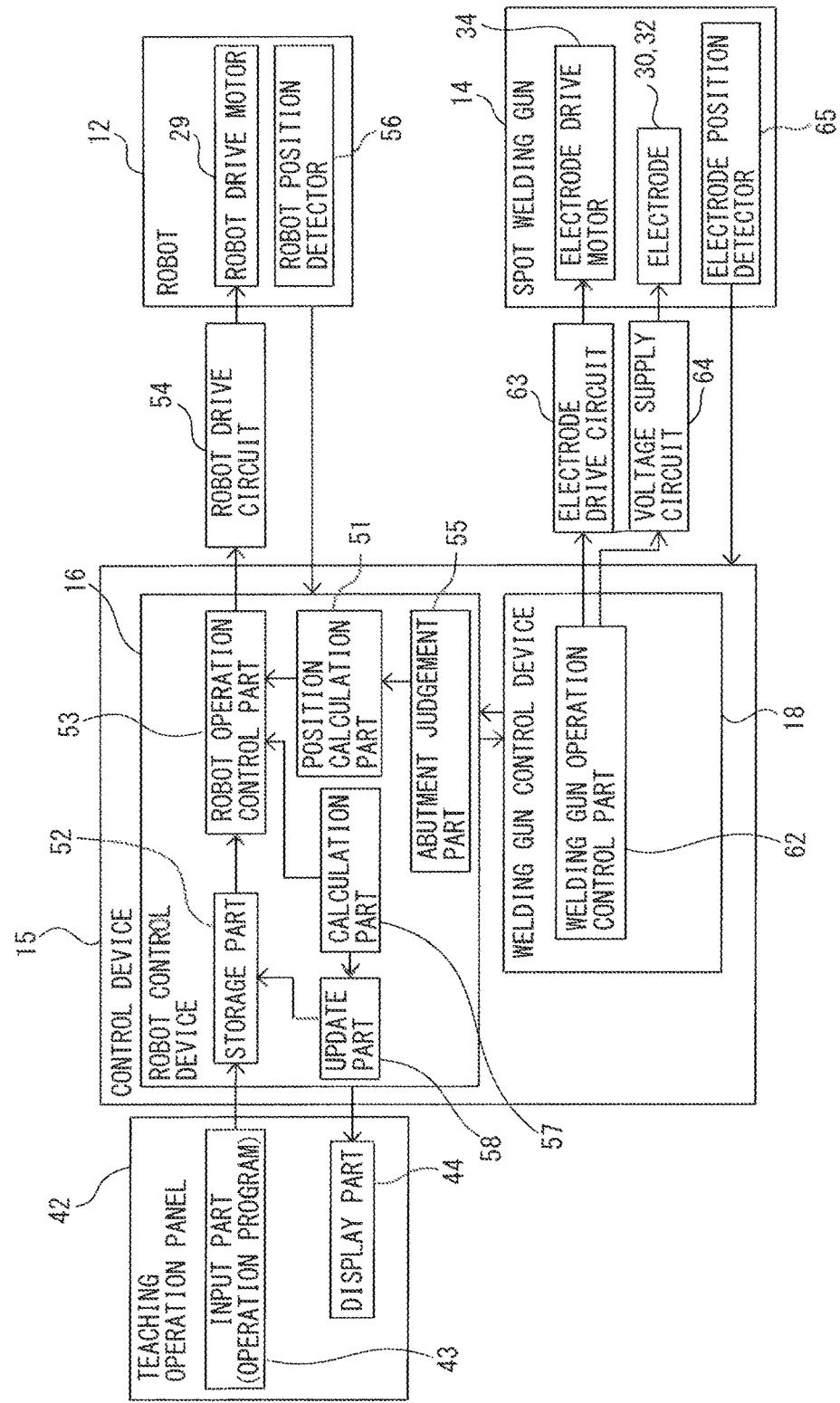
FIG. 28 is a block diagram of the spot welding system according to a third embodiment.

FIG. 28 is a block diagram of the spot welding system according to the present embodiment. The robot control device 16 according to the present embodiment includes a calculation part 57 which judges whether or not the workpiece detection parameter is large and an update part 58 which updates the workpiece detection parameter set in the operation program. The other configuration is similar to the first spot welding system according to the first embodiment (see FIG. 1 and FIG. 2). To begin with, an update of a movement speed of the movable electrode will be explained.

Figure 29:
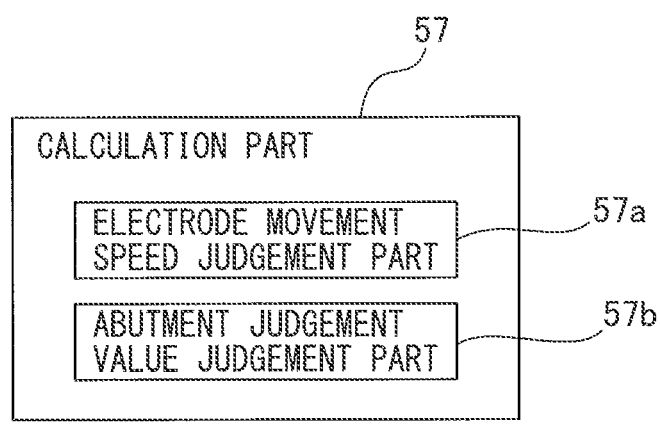
FIG. 29 is a block diagram of a calculation part of a robot control device according to the third embodiment.

In FIG. 29, a block diagram of the calculation part of the robot control device is illustrated. The calculation part 57 includes an electrode movement speed judgement part 57a which judges the movement speed of the movable electrode based on the state value of the electrode drive motor 34 when the movable electrode 30 has come into contact with a surface of the workpiece W. The electrode movement speed judgement part 57a judges the movement speed of the movable electrode 30 in accordance with a magnitude of the rigidity of the workpiece W with respect to each welding point.

Figure 30:
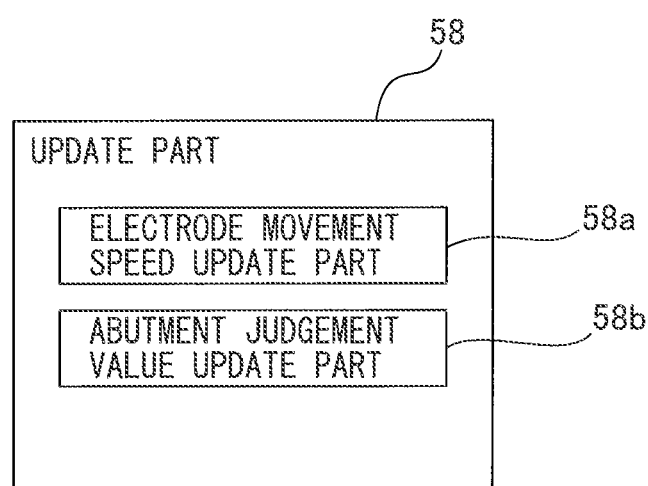
FIG. 30 is a block diagram of an update part of the robot control device according to the third embodiment.

In FIG. 30, a block diagram of the update part is illustrated. The update part 58 includes an electrode movement speed update part 58a which updates the movement speed of the movable electrode 30 set in the operation program.

Figure 31:
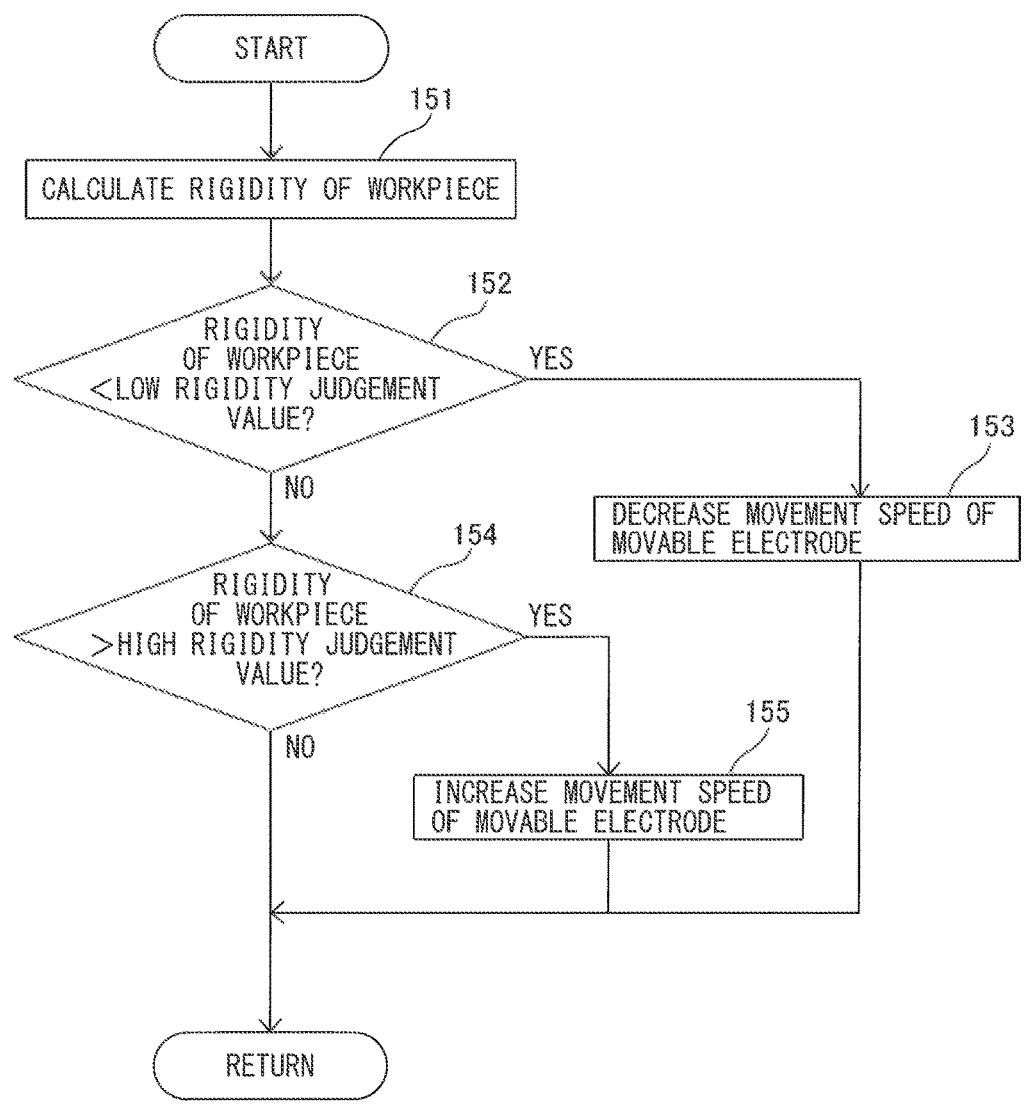
FIG. 31 is a flowchart of a control for updating the movement speed of the movable electrode according to the third embodiment.

In FIG. 31, a flowchart of a control for updating the movement speed of the movable electrode. In step 151, the electrode movement speed judgement part 57a estimates the rigidity of the workpiece W with respect to each welding point. For example, when the position at which the workpiece W is fixed to closed to a position of a welding point, the rigidity of the workpiece W is high. In this step, the electrode movement speed judgement part 57a can calculate a variable corresponding to the rigidity of the workpiece as the rigidity of the workpiece. The electrode movement speed judgement part 57a according to the present embodiment calculates, as the rigidity, the increase rate of the electric current when the electrode drive motor 34 is driven (see FIG. 6). When the rigidity of the workpiece W is high, the increase rate of the electric current of the electrode drive motor 34 becomes high.

Subsequently, in step 152, the electrode movement speed judgement part 57a judges whether or not the rigidity of the workpiece W is less than a predetermined low rigidity judgement value. In this step, it is judged whether or not the rigidity is very low. In the present embodiment, it is judged whether or not the increase rate of the electric current is lower than a low rigidity judgement value relating to the increase rate of the electric current. The low rigidity judgement value can be determined in advance. In step 152, when the rigidity of the workpiece W is less than the low rigidity judgement value, the control proceeds to step 153.

In step 153, the electrode movement speed update part 58a of the update part 58 performs a control to decrease the movement speed of the movable electrode set in the operation program. For example, with reference to FIG. 9, the electrode movement speed update part 58a can set the movement speed of the movable electrode described in the region 84 to be a predetermined low value. Alternatively, the electrode movement speed update part 58a may control to subtract a predetermined value from the movement speed of the movable electrode described in the region 84. In step 152, when the rigidity of the workpiece W is not less than the low rigidity judgement value, the control proceeds to step 154.

In step 154, it is judged whether or not the rigidity of the workpiece which is calculated by the calculation part 57 is greater than a high rigidity judgement value. Herein, whether or not the rigidity is very high is judged. The high rigidity judgement value can be determined in advance. In the present embodiment, it is judged whether or not the increase rate of the electric current is higher than the high rigidity judgement value relating to the increase rate of the electric current. In step 154, when the rigidity of the workpiece W is greater than the high rigidity judgement value, the control proceeds to step 155.

In step 155, the electrode movement speed update part 58a controls to increase the movement speed of the movable electrode 30 set in the operation program. For example, the electrode movement speed update part 58a can control to change the movement speed of the movable electrode set in the region 84 of FIG. 9 to a predetermined high movement speed. Alternatively, the electrode movement speed update part 58a can control to add a predetermined value to the movement speed of the movable electrode set in the region 84.

In step 154, when the rigidity of the workpiece is not more than the high rigidity judgement value, judgement in which the rigidity of the workpiece is not too high and further not too low can be made. In this case, the control of updating the movement speed of the movable electrode is terminated.

Thus, in the present embodiment, the movement speed of the movable electrode can be updated based on the rigidity of the workpiece W. Consequently, an automatic update to the optimal movement speed of the movable electrode can be performed. In addition, since an update of the workpiece detection parameter in the present embodiment is also performed with respect to each welding point, an update to the optimal workpiece detection parameter can be performed with respect to each welding point.

Note that a variable corresponding to the rigidity of the workpiece is not limited to the increase rate of the electric current of the electrode drive motor, but any variable corresponding to the rigidity of the workpiece can be used. For example, a decrease rate of the rotation speed of the electrode drive motor can be employed.

Next, a control for updating the abutment judgement value described in the operation program will be explained. With reference to FIG. 29, the calculation part 57 according to the present embodiment includes an abutment judgement value judgement part 57b which judges the abutment judgement value based on the state value of the electrode drive motor 34 when the movable electrode 30 abuts on the surface of the workpiece W. With reference to FIG. 30, the update part 58 includes an abutment judgement value update part 58b which updates the abutment judgement value included in the operation program.

In FIG. 32, a flowchart of a control for updating the abutment judgement value according to the present embodiment is illustrated. In step 161, the abutment judgement value judgement part 57b calculates a magnitude of the fluctuation of the electric current. The fluctuation of the electric current corresponds to a variation range of the electric current. With reference to FIG. 5, for example, the magnitude of the fluctuation of the electric current can be calculated by subtracting a minimum value from a maximum value at the interval TB from the time t1 to the time t2.

With reference to FIG. 32, subsequently, in step 162, the abutment judgement value judgement part 57b judges whether or not the magnitude of the fluctuation of the electric current is less than a predetermined low fluctuation judgement value. The low fluctuation judgement value can be determined in advance. In step 162, when the magnitude of the fluctuation is less than a predetermined low fluctuation judgement value, the control proceeds to step 163. In this case, judgement in which the fluctuation is very small can be made.

In step 163, the abutment judgement value update part 58b performs a control to decrease the abutment judgement value set in the operation program. In other words, the abutment judgement value update part 58b performs a control to narrow a tolerance range in which judgement is made. When the abutment judgement value is set by the increase amount of the electric current of the electrode drive motor, a control to decrease a judgement value of the increase amount of the electric current which is set is performed. For example, the abutment judgement value update part 58b controls to decrease the abutment judgement value to a predetermined value. Alternatively, the abutment judgement value update part 58b can performs a control to update the current abutment judgement value set in the operation program to the abutment judgement value from which a predetermined value is subtracted. In step 162, when the magnitude of the fluctuation is not less than the low fluctuation judgement value, the control proceeds to step 164.

In step 164, the abutment judgement value judgement part 57b judges whether or not the magnitude of the fluctuation is greater than a predetermined high fluctuation judgement value. The high fluctuation judgement value can be determined in advance. In step 164, when the magnitude of the fluctuation is greater than the high fluctuation judgement value, the control proceeds to step 165.

In step 165, the abutment judgement value update part 58b performs a control to increase the abutment judgement value set in the operation program. In other words, the abutment judgement value update part 58b performs a control to widen a tolerance range in which judgement is made. For example, the abutment judgement value update part 58b performs a control to increase the abutment judgement value to a predetermined value. Alternatively, the abutment judgement value update part 58b can performs a control to update the current abutment judgement value set in the operation program to the abutment judgement value to which a predetermined value is added.

In step 164, when the magnitude of the fluctuation is not more than the high fluctuation judgement value, judgement in which the magnitude of the fluctuation is not too great and further not too little can be made. In this case, the control of updating the abutment judgement value is terminated.

The controls of updating the movement speed of the movable electrode and the abutment judgement value according to the present embodiment can be performed at the same time. In addition, as described in the second embodiment, when the robot is driven in place of the movable electrode, the state value of the robot drive motor and the abutment judgement value can be used in place of the state value of the electrode drive motor and the abutment judgement value.

The other configuration, operations, and effects are similar to the first and second embodiments and thus description will not be repeated here.

The spot welding system of the present invention can set a parameter for detecting a position of a workpiece with respect to each welding point in a control to detect the position of the workpiece.

In each control as described above, the order of steps can be appropriately changed within a range in which functions and operations are not changed. Further, the embodiments as described above can be appropriately combined.

In each drawing as described above, the same or similar components are assigned the same reference signs. Note that the embodiments as described above are illustrative and are not to limit the invention. Moreover, the embodiments include modifications of the embodiments recited in the claims.

The invention claimed is:

1. A spot welding system comprising:
a spot welding gun including a pair of electrodes disposed so as to be opposed to each other;
a robot which changes a relative position of the spot welding gun and a workpiece so that the workpiece is disposed between the pair of electrodes; and
a control device which controls the spot welding gun and the robot, wherein
the robot includes a robot position detector for detecting a position and a posture of the robot,
the spot welding gun includes a movable electrode which can move, an opposite electrode which is opposed to the movable electrode, an electrode drive motor which drives the movable electrode, and an electrode position detector for detecting a position of the movable electrode,
the control device includes a storage part which stores an operation program and is formed so as to be capable of detecting a state value of the electrode drive motor including an electric current, a torque, or a number of rotations of the electrode drive motor, and further, drives the movable electrode and is formed so as to perform a position detection control which detects a position of the workpiece based on the position of the movable electrode when the state value of the electrode drive motor deviates from a predetermined range,
a plurality of welding points are set in the operation program and the operation program includes a workpiece detection parameter for performing the position detection control,
the workpiece detection parameter is set at each welding point, and
the control device performs the position detection control based on the workpiece detection parameter obtained from the operation program with respect to each welding point.

2. The spot welding system according to claim 1, wherein the workpiece detection parameter is associated with a welding instruction at the plurality of welding points.

3. The spot welding system according to claim 2, wherein the workpiece detection parameter is included in the welding instruction at each welding point.

4. The spot welding system according to claim 2, wherein the operation program includes the welding instruction at each welding point and setting information for setting the workpiece detection parameter at each welding point,
the welding instruction includes a sign or a number relating to the workpiece detection parameter, and the workpiece detection parameter corresponding to the sign or the number is set in the setting information.

5. The spot welding system according to claim 1, wherein the workpiece detection parameter includes a movement speed of the movable electrode when the movable electrode moves close to a surface of the workpiece.

6. The spot welding system according to claim 5, wherein the control device includes:
a calculation part which calculates the movement speed of the movable electrode based on the state value of the electrode drive motor when the movable electrode abuts on the surface of the workpiece; and
an update part which updates the movement speed of the movable electrode set in the operation program based on the movement speed of the movable electrode calculated by the calculation part.

7. The spot welding system according to claim 1, wherein the workpiece detection parameter includes an abutment judgement value for judging whether or not the movable electrode abuts on a surface of the workpiece.

8. The spot welding system according to claim wherein the control device includes:
a calculation part which calculates the abutment judgement value based on the state value of the electrode drive motor when the movable electrode abuts on the surface of the workpiece; and
an update part which updates the abutment judgement value set in the operation program based on the abutment judgement value calculated by the calculation part.

9. A spot welding system comprising:
a spot welding gun including a pair of electrodes disposed so as to be opposed to each other;
a robot which changes a relative position of the spot welding gun and a workpiece so that the workpiece is disposed between the pair of electrodes; and
a control device which controls the spot welding gun and the robot, wherein
the robot includes a robot drive motor which drives arms and a wrist portion and a robot position detector for detecting a position and a posture of the robot,
the control device includes a storage part which stores an operation program and is formed so as to be capable of detecting a state value of the robot drive motor including an electric current, a torque, or a number of rotations of the robot drive motor, and further, drives the robot and is formed so as to perform a position detection control which detects a position of the workpiece based on the position and the posture of the robot when the state value of the robot drive motor deviates from a predetermined range,
a plurality of welding points are set in the operation program and the operation program includes a workpiece detection parameter for performing the position detection control,
the workpiece detection parameter is set at each welding point, and
the control device performs the position detection control based on the workpiece detection parameter obtained from the operation program with respect to each welding point.

* * * * *

UNITED STATES PATENT AND TRADEMARK OFFICE
CERTIFICATE OF CORRECTION

PATENT NO. : 10,146,203 B2
APPLICATION NO. : 15/266373
DATED : December 4, 2018
INVENTOR(S) : Masanobu Hatada and Toshimichi Aoki Page 1 of 1

It is certified that error appears in the above-identified patent and that said Letters Patent is hereby corrected as shown below:

In the Claims

Column 22, Line 22, insert -- 7 -- after claim.

Signed and Sealed this
Nineteenth Day of February, 2019

Andrei Iancu
*Director of the United States Patent and Trademark Office*